United States Patent
Langseth et al.

(10) Patent No.: US 9,696,903 B2
(45) Date of Patent: *Jul. 4, 2017

(54) REAL-TIME DATA VISUALIZATION OF STREAMING DATA

(71) Applicant: Zoomdata, Inc., Reston, VA (US)

(72) Inventors: Justin Langseth, Great Falls, VA (US); Farzad Aref, McLean, VA (US); Jorge Alarcon, Fairfax, VA (US); William Lindner, III, Arlington, VA (US)

(73) Assignee: ZOOMDATA, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,733

(22) Filed: Jun. 29, 2016

(65) Prior Publication Data

US 2016/0313911 A1    Oct. 27, 2016

Related U.S. Application Data

(63) Continuation of application No. 14/153,664, filed on Jan. 13, 2014, now Pat. No. 9,411,807, which is a
(Continued)

(51) Int. Cl.
*G06F 3/00* (2006.01)
*G06F 3/0488* (2013.01)
(Continued)

(52) U.S. Cl.
CPC ........ *G06F 3/04883* (2013.01); *G06F 3/0482* (2013.01); *G06F 3/0486* (2013.01);
(Continued)

(58) Field of Classification Search
CPC ...... G06F 3/0482; G06F 3/0484; G06F 9/542; G06F 3/04883; G06F 3/04886; G06F 3/048; G06F 3/0481
See application file for complete search history.

(56) References Cited

U.S. PATENT DOCUMENTS 4,769,772 A    9/1988  Dwyer
6,026,397 A *  2/2000  Sheppard ............ G06F 17/3071
(Continued)

FOREIGN PATENT DOCUMENTS

CN    103412922 A    11/2013
CN    105677511 A    6/2016
(Continued)

OTHER PUBLICATIONS

Bennett et al., "Feature-Based Statistical Analysis of Combustion Simulation Data", *IEEE Transactions on Visualization and Computer Graphics*, vol. 17, No. 12, Dec. 2011, pp. 1822-1831 (10 pages).
(Continued)

*Primary Examiner* — Linh K Pham
(74) *Attorney, Agent, or Firm* — Pillsbury Winthrop Shaw Pittman LLP

(57) ABSTRACT

In certain implementations, a first data element set associated with a first attribute (including first data elements where each represents a value associated with the first attribute) may be provided on a user interface. A control element set, including control elements where each represent an attribute, may be provided on the user interface. A touch-based input indicating a touch-based association of a first one of the control elements with a first one of the first data elements may be received. Responsive to the touch-based association, a second data element set associated with a second attribute (represented by the first one of the control elements) may be provided on the user interface. Second data elements of the second data element set may each represent a second value associated with the second attribute and correspond to a first value represented by the first one of the first data elements.

20 Claims, 15 Drawing Sheets

Related U.S. Application Data continuation of application No. 13/963,668, filed on Aug. 9, 2013, now Pat. No. 8,631,325.

(51) Int. Cl.
  *G06Q 10/10* (2012.01)
  *G06F 17/30* (2006.01)
  *G06F 3/0481* (2013.01)
  *G06F 3/0482* (2013.01)
  *G06F 3/0485* (2013.01)
  *G06F 3/0486* (2013.01)
  *G06F 3/0484* (2013.01)

(52) U.S. Cl.
  CPC ........ *G06F 3/0488* (2013.01); *G06F 3/04817* (2013.01); *G06F 3/04847* (2013.01); *G06F 3/04855* (2013.01); *G06F 17/30017* (2013.01); *G06F 17/30309* (2013.01); *G06F 17/30516* (2013.01); *G06F 17/30536* (2013.01); *G06F 17/30554* (2013.01); *G06Q 10/10* (2013.01); *G06F 2203/04806* (2013.01)

(56) References Cited

U.S. PATENT DOCUMENTS

| | | | |
|---|---|---|---|
| 6,072,493 A * | 6/2000 | Driskell | G06Q 10/06 715/804 |
| 6,505,246 B1 * | 1/2003 | Land | G06F 11/323 709/224 |
| 6,519,604 B1 | 2/2003 | Acharya et al. | |
| 6,633,873 B1 | 10/2003 | Nakamura | |
| 7,155,475 B2 | 12/2006 | Agnoli et al. | |
| 7,308,445 B2 | 12/2007 | Bharat et al. | |
| 7,333,974 B2 | 2/2008 | Patterson | |
| 7,340,409 B1 | 3/2008 | Ulwick | |
| 7,373,389 B2 | 5/2008 | Rosenbaum et al. | |
| 7,467,131 B1 | 12/2008 | Gharachorloo et al. | |
| 7,502,366 B1 | 3/2009 | Erimli et al. | |
| 7,673,278 B2 | 3/2010 | Rathsack et al. | |
| 7,680,781 B1 | 3/2010 | Wasserman et al. | |
| 7,688,322 B2 | 3/2010 | Kapler et al. | |
| 7,693,816 B2 | 4/2010 | Nemoto et al. | |
| 7,761,324 B2 * | 7/2010 | Amerasinghe | G06Q 10/063 705/7.11 |
| 7,792,835 B2 | 9/2010 | Bohannon et al. | |
| 7,814,042 B2 | 10/2010 | Ahmed | |
| 7,822,658 B2 | 10/2010 | Casati et al. | |
| 8,027,854 B2 | 9/2011 | Baggett et al. | |
| 8,090,715 B2 | 1/2012 | Matias | |
| 8,095,935 B2 | 1/2012 | Paramasivam et al. | |
| 8,122,223 B2 | 2/2012 | Cantin et al. | |
| 8,140,698 B2 | 3/2012 | Codella et al. | |
| 8,180,720 B1 | 5/2012 | Kovacs et al. | |
| 8,489,982 B2 * | 7/2013 | Davis | G06F 17/30014 715/212 |
| 8,521,574 B1 | 8/2013 | Rajan et al. | |
| 8,539,565 B2 | 9/2013 | Beletski et al. | |
| 8,542,117 B1 | 9/2013 | Miasnik et al. | |
| 8,566,788 B2 | 10/2013 | Snodgrass et al. | |
| 8,631,325 B1 | 1/2014 | Langseth et al. | |
| 8,849,730 B2 | 9/2014 | Winn et al. | |
| 8,892,638 B2 | 11/2014 | Chang et al. | |
| 8,938,688 B2 | 1/2015 | Bradford et al. | |
| 8,959,108 B2 | 2/2015 | Pereira et al. | |
| 8,972,434 B2 | 3/2015 | English et al. | |
| 9,047,616 B2 | 6/2015 | Schnabl et al. | |
| 9,069,864 B2 | 6/2015 | Liu | |
| 9,154,549 B2 | 10/2015 | Sundararaj | |
| 9,158,786 B1 | 10/2015 | Walsh et al. | |
| 9,172,809 B1 | 10/2015 | Mockus et al. | |
| 9,235,637 B1 | 1/2016 | Kamvar et al. | |
| 9,251,276 B1 | 2/2016 | Langseth et al. | |
| 9,357,020 B2 | 5/2016 | Ishida et al. | |
| 9,424,336 B2 | 8/2016 | Fuchs et al. | |
| 9,507,718 B2 | 11/2016 | Rash et al. | |
| 9,521,176 B2 | 12/2016 | Agnoli et al. | |
| 9,563,657 B2 | 2/2017 | Martins | |
| 2002/0091994 A1 * | 7/2002 | McCready | G06Q 10/04 717/124 |
| 2003/0158913 A1 | 8/2003 | Agnoli et al. | |
| 2003/0182261 A1 | 9/2003 | Patterson | |
| 2003/0225644 A1 | 12/2003 | Casati et al. | |
| 2004/0193631 A1 * | 9/2004 | Kumashio | G06F 17/30011 |
| 2004/0221053 A1 | 11/2004 | Codella et al. | |
| 2004/0249810 A1 | 12/2004 | Das et al. | |
| 2005/0165753 A1 | 7/2005 | Chen et al. | |
| 2005/0234890 A1 | 10/2005 | Enzler et al. | |
| 2006/0036600 A1 | 2/2006 | Chaudhuri et al. | |
| 2006/0047830 A1 | 3/2006 | Nair et al. | |
| 2006/0106759 A1 | 5/2006 | Nemoto et al. | |
| 2006/0155920 A1 | 7/2006 | Smith et al. | |
| 2006/0265288 A1 | 11/2006 | Aronson | |
| 2006/0293872 A1 | 12/2006 | Zamora et al. | |
| 2007/0022256 A1 | 1/2007 | Cantin et al. | |
| 2007/0162425 A1 | 7/2007 | Betawadkar-Norwood | |
| 2007/0174188 A1 | 7/2007 | Fish | |
| 2007/0208607 A1 * | 9/2007 | Amerasinghe | G06Q 10/0637 705/7.31 |
| 2007/0226178 A1 | 9/2007 | Ewen et al. | |
| 2008/0065588 A1 | 3/2008 | Aldrich | |
| 2009/0013089 A1 | 1/2009 | Sullivan et al. | |
| 2009/0132906 A1 * | 5/2009 | Aoki | G06F 3/0481 715/234 |
| 2009/0144103 A1 * | 6/2009 | Malov | G06Q 40/06 705/7.35 |
| 2009/0150343 A1 | 6/2009 | English et al. | |
| 2009/0177667 A1 | 7/2009 | Ramos et al. | |
| 2009/0177988 A1 | 7/2009 | Martins | |
| 2009/0241176 A1 | 9/2009 | Beletski et al. | |
| 2009/0259522 A1 * | 10/2009 | Rapperport | G06Q 10/04 705/7.35 |
| 2009/0287814 A1 | 11/2009 | Robertson et al. | |
| 2009/0300544 A1 * | 12/2009 | Psenka | G06F 17/30554 715/810 |
| 2009/0322755 A1 | 12/2009 | Holm-Peterson et al. | |
| 2009/0328054 A1 | 12/2009 | Paramasivam et al. | |
| 2010/0010984 A1 | 1/2010 | Matias | |
| 2010/0017740 A1 * | 1/2010 | Gonzalez Veron | G06F 3/0481 715/777 |
| 2010/0131654 A1 | 5/2010 | Malakapalli et al. | |
| 2010/0153429 A1 | 6/2010 | Xu et al. | |
| 2010/0162152 A1 | 6/2010 | Allyn et al. | |
| 2010/0185619 A1 | 7/2010 | Zhang et al. | |
| 2010/0205128 A1 | 8/2010 | Nolan et al. | |
| 2011/0055202 A1 | 3/2011 | Heimendinger | |
| 2011/0137896 A1 | 6/2011 | Masunaga et al. | |
| 2011/0202841 A1 * | 8/2011 | Dempster | G06Q 10/06 715/716 |
| 2011/0246388 A1 | 10/2011 | Zhang | |
| 2011/0271071 A1 | 11/2011 | Nakatogawa | |
| 2011/0289185 A1 | 11/2011 | Heder et al. | |
| 2012/0023120 A1 | 1/2012 | Kanefsky | |
| 2012/0089920 A1 | 4/2012 | Eick | |
| 2012/0095958 A1 | 4/2012 | Pereira et al. | |
| 2012/0151399 A1 | 6/2012 | Soerensen et al. | |
| 2012/0173759 A1 | 7/2012 | Agarwal et al. | |
| 2012/0203762 A1 | 8/2012 | Kakarlamudi | |
| 2012/0210119 A1 | 8/2012 | Baxter et al. | |
| 2012/0254316 A1 | 10/2012 | Son et al. | |
| 2012/0271748 A1 | 10/2012 | DiSalvo | |
| 2012/0299965 A1 | 11/2012 | Agarwal et al. | |
| 2013/0066895 A1 | 3/2013 | Choi et al. | |
| 2013/0083031 A1 | 4/2013 | Lehnherr et al. | |
| 2013/0111467 A1 | 5/2013 | Sundararaj | |
| 2013/0173707 A1 | 7/2013 | Ishida et al. | |
| 2013/0208591 A1 | 8/2013 | Larsen et al. | |
| 2013/0268520 A1 | 10/2013 | Fisher et al. | |
| 2013/0297646 A1 | 11/2013 | Watari | |
| 2013/0304798 A1 | 11/2013 | Chang et al. | |
| 2014/0156343 A1 | 6/2014 | Olsen | |
| 2014/0207756 A1 | 7/2014 | Kaminsky et al. | |
| 2014/0301191 A1 | 10/2014 | Ludwig et al. | |

(56) References Cited

U.S. PATENT DOCUMENTS

| | | |
|---|---|---|
| 2014/0310470 A1 | 10/2014 | Rash et al. |
| 2014/0358634 A1 | 12/2014 | Schnabl et al. |
| 2014/0359471 A1 | 12/2014 | Roundtree et al. |
| 2015/0006483 A1 | 1/2015 | Goetsch |
| 2015/0006615 A1 | 1/2015 | Wainner et al. |
| 2015/0046429 A1 | 2/2015 | Eblighatian |
| 2015/0046449 A1 | 2/2015 | Langseth et al. |
| 2015/0046815 A1 | 2/2015 | Langseth et al. |
| 2015/0088919 A1 | 3/2015 | Hunter et al. |
| 2015/0106431 A1 | 4/2015 | Kumbalimutt et al. |
| 2015/0161211 A1 | 6/2015 | Patel et al. |
| 2015/0254307 A1 | 9/2015 | Johnson et al. |
| 2015/0261773 A1 | 9/2015 | Walid et al. |
| 2015/0324356 A1 | 11/2015 | Andres Gutierrez et al. |
| 2015/0334091 A1 | 11/2015 | Tock et al. |
| 2015/0341407 A1 | 11/2015 | Agnoli et al. |
| 2016/0004744 A1 | 1/2016 | Eriksson |
| 2016/0224641 A1 | 8/2016 | Elias et al. |
| 2016/0239765 A1 | 8/2016 | Pasero et al. |
| 2016/0246519 A1 | 8/2016 | McKean et al. |
| 2016/0321270 A1 | 11/2016 | Hansson et al. |

FOREIGN PATENT DOCUMENTS

| | | |
|---|---|---|
| WO | WO 2007/068279 A1 | 6/2007 |
| WO | WO 2014/011708 | 1/2014 |
| WO | WO 2016/021019 | 2/2016 |

OTHER PUBLICATIONS

Keim et al., "Information Visualization and Visual Data Mining", *IEEE Transactions on Visualization and Computer Graphics*, vol. 8, No. 1, Jan.-Mar. 2002, pp. 1-8.

Kandel et al., "Enterprise Data Analysis and Visualization: An Interview Study", *IEEE Transactions on Visualization and Computer Graphics*, vol. 18, No. 12, Dec. 2012, pp. 2017-2026 (10 pages).

Pham et al., "Visualization of Diversity in Large Multivariate Data Sets", *IEEE Transactions on Visualization and Computer Graphics*, vol. 16, No. 6, Nov./Dec. 2010, pp. 1053-1062 (10 pages).

Rubel et al., "Integrating Data Clustering and Visualization for the Analysis of 3D Gene Expression Data", *IEEE/ACM Transactions on Computational Biology and Bioinformatics*, vol. 7, No. 1, Jan.-Mar. 2010, pp. 64-79 (16 pages).

Yu et al., "Visual Mining of Multimedia Data for Social and Behavioral Studies", *IEEE Symposium on Visual Analytics Science and Technology*, Oct. 21-23, 2008, pp. 155-162 (8 pages).

Baron Schwartz, "Selecting Representative Samples From a Stream of Queries", Jul. 3, 2015 downloaded from URL <https://www.vividcortex.com/blog/2015/07/03/representative-samples-stream-queries/>, 6 pages.

Surajit Chaudhuri et al., "Optimized Stratified Sampling for Approximate Query Processing", ACM Transactions on Database Systems, vol. 32, No. 2, Article 9, Jun. 2007, downloaded from URL<http://ranger.uta.edu/~gdas/websitepages/preprints-papers/a9-chaudhuri.pdf>, 50 pages.

Daniel Gomes et al., "Webstore: a Manager for Incremental Storage of Contents", Nov. 2004, downloaded from URLhttp://repositorio.ul.pt/bitstream/10455/2910/1/04-15.pdf, 22 pages.

Hussam Abu-Libdeh et al., "RACS: A Case for Cloud Storage Diversity", SoCC'10, Jun. 10-11, 2010, downloaded from URL>http://pubs.0xff.ps/papers/racs-socc.pdf>, 11 pages.

Valeria Cardellini et al., "Dynamic Load Balancing on Web-server Systems", IEEE Internet Computing, vol. 3, No. 3, May-Jun. 1999, pp. 28-39.

P. Kuppusamy et al. "Cluster Based Cooperative Caching Approach Through Mobility Prophecy in MANET", Computing Communication & Networking Technologies (ICCCNT), Third International Conference on. IEEE, Jul. 26-28, 2012, 10 pages.

Non-Final Office Action as issued in U.S. Appl. No. 15/188,975, dated Aug. 19, 2016.

Non-Final Office Action as issued in U.S. Appl. No. 15/190,153, dated Oct. 14, 2016.

Final Office Action mailed on Feb. 9, 2017 in corresponding U.S. Appl. No. 15/010,986 (29 pages).

Non-Final Office Action mailed on Feb. 17, 2017 in corresponding U.S. Appl. No. 15/382,522 (24 pages).

Non-Final Office Action mailed on Feb. 17, 2017 in corresponding U.S. Appl. No. 15/382,249 (15 pages).

Non-Final Office Action mailed on Feb. 22, 2017 in corresponding U.S. Appl. No. 15/382,513 (25 pages).

Non-Final Office Action mailed on Feb. 28, 2017 in corresponding U.S. Appl. No. 15/382,510 (26 pages).

Non-Final Office Action mailed on Mar. 21, 2017 in corresponding U.S. Appl. No. 15/409,499 (34 pages).

Non-Final Office Action mailed on Mar. 24, 2017 in corresponding U.S. Appl. No. 15/382,534 (13 pages).

Final Office Action mailed on Apr. 27, 2017 in corresponding U.S. Appl. No. 15/190,153 (17 pages).

Non-Final Office Action mailed on Mar. 13, 2017 in corresponding U.S. Appl. No. 15/428,136 (19 pages).

\* cited by examiner

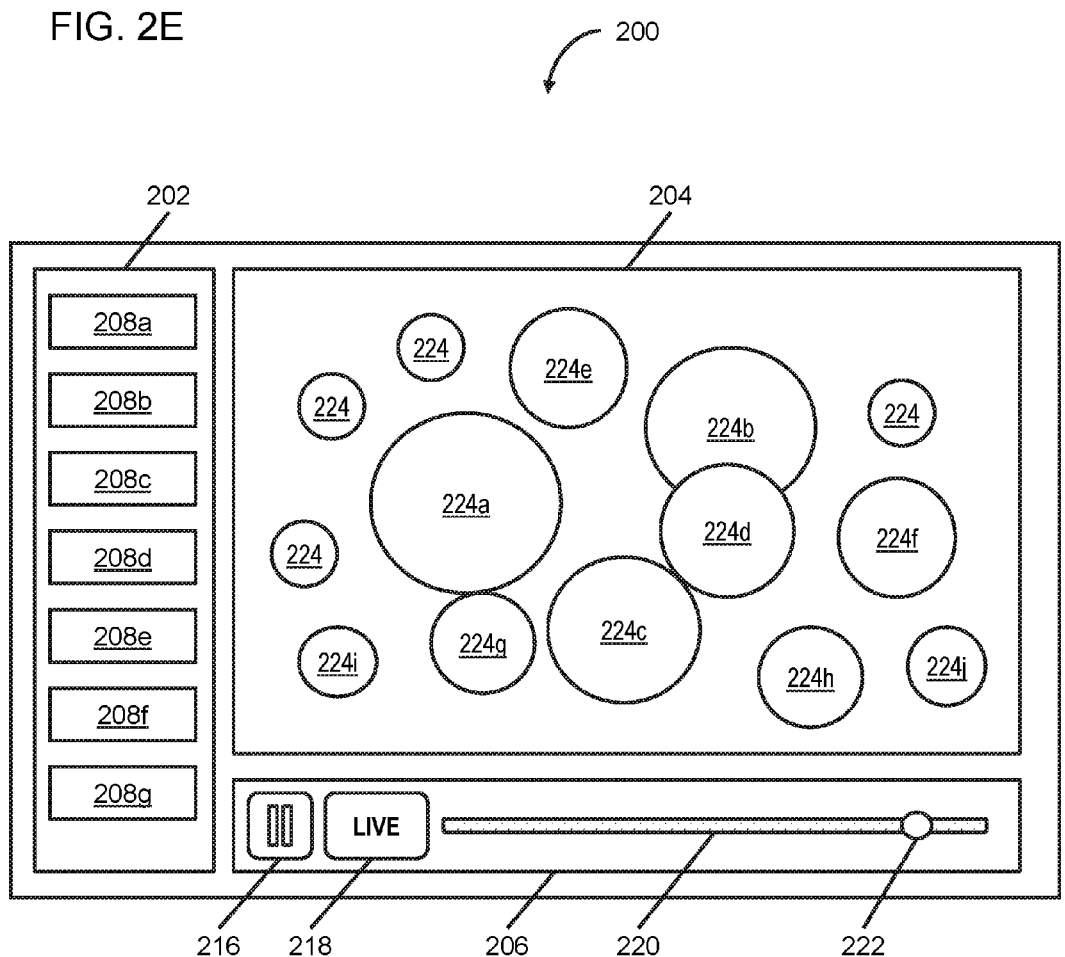

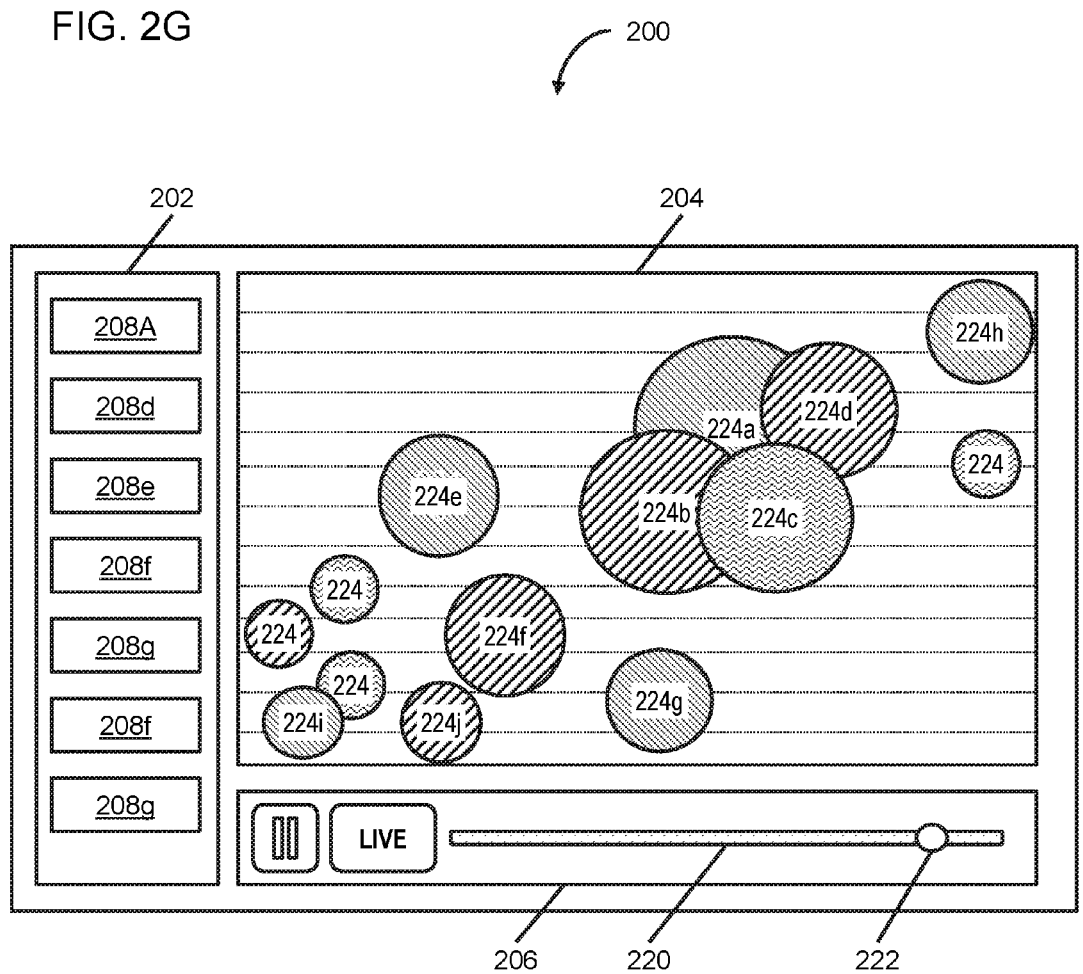

REAL-TIME DATA VISUALIZATION OF STREAMING DATA

CROSS-REFERENCE TO RELATED APPLICATIONS

This application is a continuation of U.S. patent application Ser. No. 14/153,664, filed Jan. 13, 2014, which is a continuation of U.S. patent application Ser. No. 13/963,668, filed Aug. 9, 2013 (issued as U.S. Pat. No. 8,631,325 on Jan. 14, 2014), the entire contents of which are hereby incorporated herein by reference in their entirety.

FIELD OF THE INVENTION

The invention relates generally to data visualization, including real-time data visualization of streaming data using touch-association-based creation and interaction, multi-data-store retrieval of data, multiple-query-based sharpening, and/or other features.

BACKGROUND OF THE INVENTION

With the recent influx of smartphones, tablets, and/or other mobile devices having connectivity to the Internet, businesses, consumers, or other users are frequently receiving, analyzing, sharing, and creating new information. However, users are unable to understand and/or keep track of the copious amounts of available information. In addition, while traditional data visualization tools are available, these tools generally lack features optimized for touch interactions, real-time handling of data streams, etc. These and other drawbacks exists.

SUMMARY OF THE INVENTION

The invention addressing these and other drawbacks relates to methods, apparatuses, and/or systems for facilitating real-time data visualization of streaming data. In exemplary implementations, real-time, tactile, interactive data visualizations that enable users to easily swipe, pinch, zoom-in or zoom-out, drag-and-drop, rotate, or perform other operations to gain a better understanding of the data may be provided. Data streams from internal and/or external sources may be combined, organized, and/or analyzed. Real-time data visualizations may be provided based on the results of the combining, organizing, and/or analyzing. A time-based slider may enable users to seamlessly switch between live and historical streams that can come from various sources (e.g., real-time store, temporary data cache, historical data store, etc.). Real-time data may be compared with a historical baseline based on simultaneously streaming from a real-time store, a temporary data cache, or a historical data store. It is understood that various features (e.g., components, operations, or other features) described herein may be implemented separately or in combination with other features.

A system for facilitating real-time data visualization of streaming data may comprise one or more servers (or other components) that include one or more processors configured to execute one or more computer program modules. The computer program modules may include a data visualization module, a control interface module, an input module, a switch module, a query module, or other modules.

The data visualization module may be configured to provide, in a first portion of a user interface, a first data element set associated with a first attribute. The first data element set may include individual first data elements. Each of the individual first data elements may represent a first value associated with the first attribute. The control interface module may be configured to provide, in a second portion of the user interface, a control element set that includes individual control elements. Each of the individual control elements may represent an attribute.

The input module may be configured to receive a first touch-based input indicating an association of a first one of the individual control element (provided in the second portion of the user interface) with a first one of the individual first data elements (provided in the first portion of the user interface). The data visualization module may be configured to provide a second data element set associated with a second attribute in the first portion of the user interface responsive to the association indicated by the first touch-based input. The second attribute associated with the second data element set may be different than the first attribute associated with the first data element set. The second attribute may be the attribute represented by the first one of the individual control elements. The second data element set may include individual second data elements. Each of the individual second data elements may represent a second value that is associated with the second attribute and that correspond to the first value represented by the first one of the first individual data elements.

In some implementations, the association indicated by the first touch-based input may correspond to dragging the first one of the individual control elements onto the first one of the individual first data elements or dragging the first one of the individual first data elements onto the first one of the individual control elements.

In certain implementations, the first touch-based input may indicate another association of the first one of the individual control elements with a second one of the individual first data elements. In one or more implementations, the other association indicated by the first touch-based input may correspond to dragging the first one of the individual control elements onto the second one of the individual first data elements or dragging the second one of the individual first data elements onto the first one of the individual control elements. Responsive to the other association indicated by the first touch-based input, the data visualization module may provide a third data element set associated with the second attribute (of the second data element set) in the first portion of the user interface with the second data element set. The third element set may include individual third data elements. Each of the individual third data elements may represent a second value associated with the second attribute and correspond to the first value represented by the second one of the first individual data elements.

In various implementations, the data visualization module may be configured to determine that the second attribute is the attribute represented by the first one of the individual control elements responsive to the association indicated by the first touch-based input. The data visualization module may be configured to provide the second data element set in the first portion of the user interface responsive to determining that the second attribute is the attribute represented by the first one of the individual control elements.

In some implementations, the input module may be configured to receive a second touch-based input indicating a zoom operation relating to a first one of the individual second data elements (of the second data element set). The data visualization module may be configured to provide, in the first portion of the user interface, a third data element set associated with a third attribute different than the second attribute responsive to the zoom operation indicated by the second touch-based input. The third data element set may include individual third data elements. Each of the individual third data elements may represent a third value associated with the third attribute.

In certain implementations, the zoom operation may comprise a zoom-in operation. Responsive to determining that the zoom operation comprises the zoom-in operation, the data visualization module may be configured to provide the third data element set in the first portion of the user interface such that each of the individual third data elements of the third data element set corresponds to the first value represented by the first one of the individual first data elements (of the first data element set) and the second value represented by the first one of the individual second data elements (of the second data element set). In some implementations, the zoom operation comprises a zoom-out operation. Responsive to determining that the zoom operation comprises the zoom-out operation, the data visualization module may be configured to such that the third attribute is the first attribute associated with the first data element set.

In various implementations, the data visualization module may be configured to determine that the third attribute (associated with the third data element set) is hierarchically lower or higher than the second attribute responsive to the zoom operation indicated by the second touch-based input. The data visualization module may be configured to, responsive to determining that the third attribute is hierarchically lower or higher than the second attribute, provide the third data element set in the first portion of the user interface based on the third data element set being associated with the third attribute.

In certain implementations, the query module may be configured to perform queries relating to the second attribute (associated with the second data element set) across a plurality of sources responsive to the association (of the first one of the individual control elements of the control element set with the first one of the individual first data elements of the first data element set) indicated by the first touch-based input. The query module may be configured to receive individual subsets of data relating to the second values (represented by the individual second data elements of the second data element set). The data visualization module may be configured to predict at least some of the second values using the individual subsets of data based on a determination that other subsets of data relating to the at least some of the second values have not yet been received. The data visualization module may be configured to generate the individual second data elements (of the second data element set) based on the prediction. The second data element set may be provided based on the generated individual second data elements.

In some implementations, the data visualization module may be configured to provide, in a first portion of a user interface, a first data element set that includes individual first data elements representing first values associated with at least one attribute. The control interface module may be configured to provide, in a second portion of the user interface, a sliding-based control element that includes a moveable control element and points associated with times. The data visualization module may be configured to dynamically update the provided first data element set in real-time responsive to real-time streaming of data from a plurality of sources. The provided first data element set may be dynamically updated such that the individual first data elements represent dynamically updated values of the first values in lieu of the first values.

The input module may be configured to receive a first touch-based input indicating moving of the movable control element (of the sliding-based control element) to a first one of the points that is associated with a first one of the times. The switch module may be configured to, responsive to the moving of the movable control element indicated by the first touch-based input, determine whether to stream data from a temporary data cache or a historical data store to obtain second values that are associated with the at least one attribute and that correspond to the first one of the times. The data visualization module may be configured to obtain the second values based on the determination of whether to stream data from the temporary data cache or the historical data store. The data visualization module may be configured to provide, in the first portion of the user interface, a second data element set that includes individual second data elements representing the obtained second values (that are associated with the at least one attribute and that correspond to the first one of the times).

In certain implementations, the first one of the times may correspond to a time of a recent dynamic update of the provided first data element set. In some implementations, the data visualization module may be configured to dynamically update the provided second data element set responsive to streaming of data from the historical data store. The provided second data element set may, for example, be dynamically updated such that the individual second data elements represent dynamically updated values of the second values in lieu of the second values. The data visualization module may be configured to simultaneously provide, in the first portion of the user interface, the dynamically updated first data element set and the dynamically updated second data element set. The dynamically updated first data element set may correspond to a first time period. The dynamically updated second data element set may correspond to a second time period different than the first time period. The dynamically updated first data element set and the dynamically updated second data element set may continuously correspond to a same reference point of time of the first time period and the second time period.

In various implementations, the query module may be configured to perform queries relating to the at least one attribute (associated with the first data element set) on the historical data store responsive to a determination to stream data from the historical data store. The query module may be configured to receive individual subsets of data relating to the second values (that are associated with the at least one attribute and that correspond to the first one of the times) responsive to performing of the queries. The data visualization module may be configured to predict at least some of the second values using the individual subsets of data based on a determination that other subsets of data relating to the at least some of the second values have not yet been received. The data visualization module may be configured to generate the individual second data elements based on the prediction. The second data element set may be provided based on the generated individual second data elements.

These and other features of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The invention is illustrated by way of example, and not by way of limitation, in the figures of the accompanying drawing and in which like reference numerals refer to similar elements.

FIGS. 2E, 2F, 2G, 2H, 2I, and 2J illustrate exemplary diagrams of different views of a user interface for facilitating real-time data visualization of streaming data, in accordance with one or more implementations.

DETAILED DESCRIPTION OF THE INVENTION

In the following description, for the purposes of explanation, numerous specific details are set forth in order to provide a thorough understanding of the implementations of the invention. It will be appreciated, however, by one skilled in the art that the implementations of the invention may be practiced without these specific details or with an equivalent arrangement. In other instances, well-known structures and devices are shown in block diagram form in order to avoid unnecessarily obscuring the implementations of the invention. It should be noted that features (e.g., components, operations, or other features) described herein may be implemented separately or in combination with one another.

Figure 1:
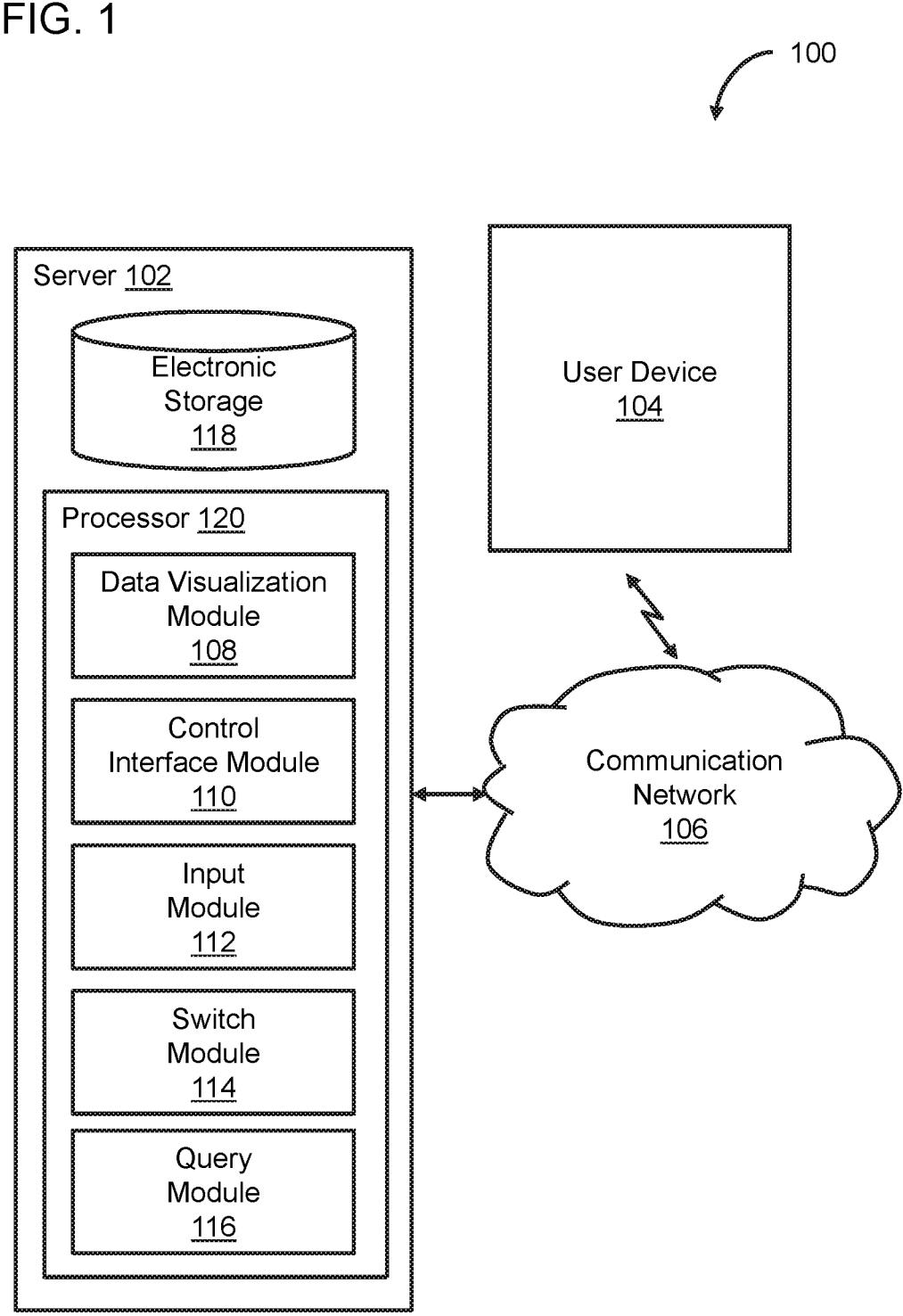
FIG. 1 illustrates a diagram of a system for facilitating real-time data visualization of streaming data, in accordance with one or more implementations.

FIG. 1 illustrates a diagram of system 100 for facilitating real-time data visualization of streaming data, in accordance with one or more implementations. System 100 may comprise one or more servers 102. Server 102 (or servers 102) may be configured to communicate with one or more user devices 104 according to a client/server architecture (e.g., over communication network 106 or via other communication medium). Users may access system 100 via user devices 104.

Server 102 may be configured to execute one or more computer program modules to facilitate real-time data visualization of streaming data. The computer program modules may include a data visualization module 108, a control interface module 110, an input module 112, a switch module 114, a query module 116, or other modules.

Data visualization module 108 may be configured to provide, in a first portion of a user interface, a first data element set associated with a first attribute. The first data element set may include individual first data elements. Each of the individual first data elements may represent a first value associated with the first attribute. Control interface module 110 may be configured to provide, in a second portion of the user interface, a control element set that includes individual control elements. Each of the individual control elements may represent an attribute.

Figure 2A:
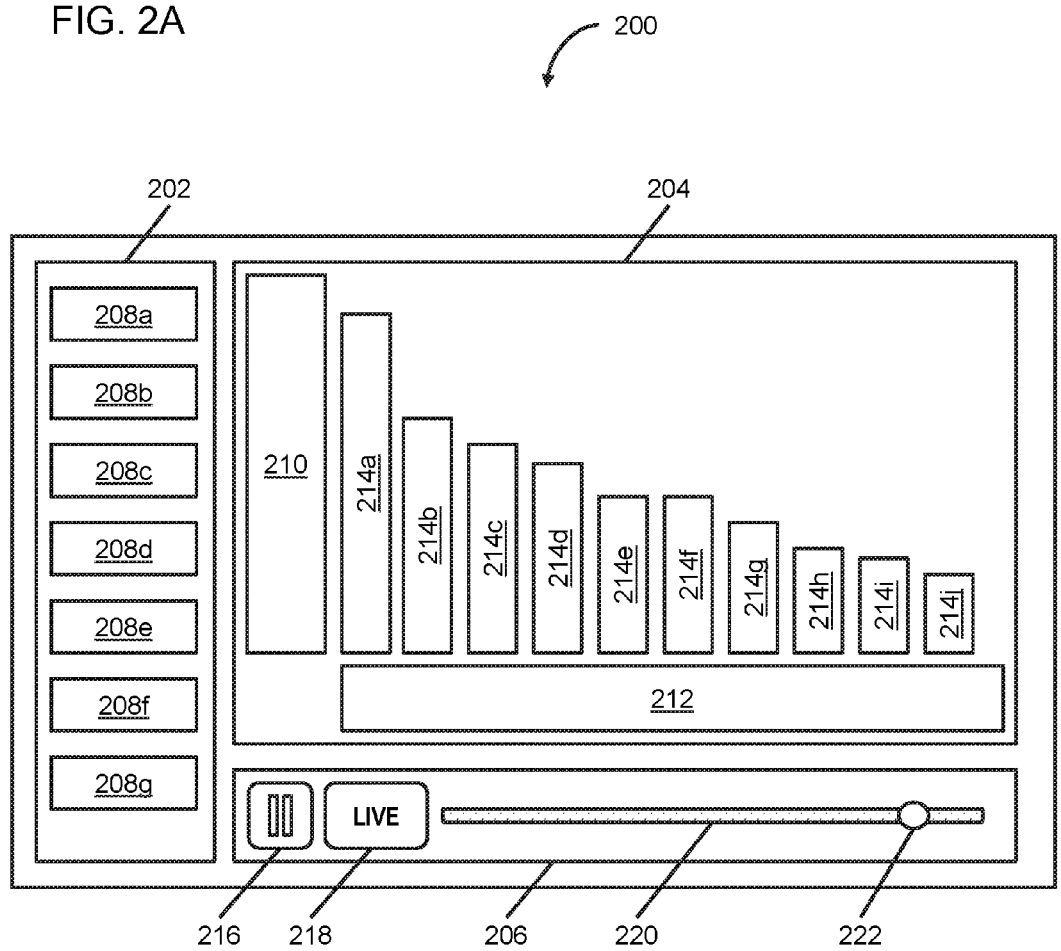
FIG. 2A illustrates an exemplary diagram of a user interface for facilitating real-time data visualization of streaming data, in accordance with one or more implementations.
Figure 2B:
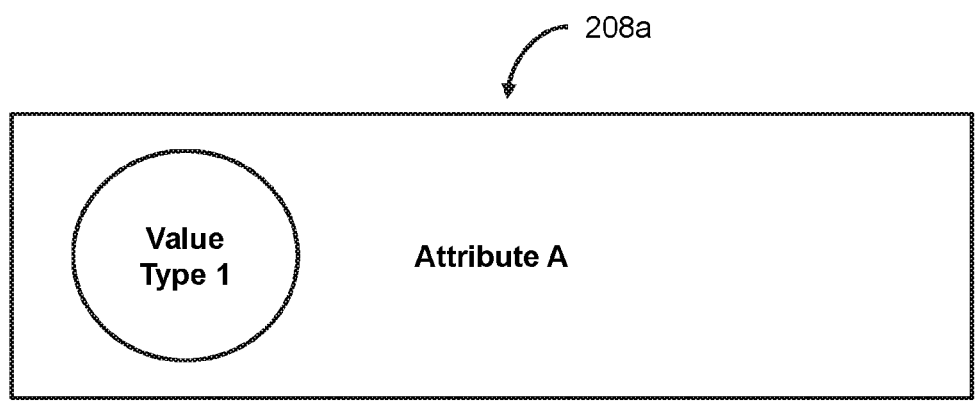
FIGS. 2B, 2C, and 2D illustrate exemplary diagrams of components of a user interface for facilitating real-time data visualization of streaming data, in accordance with one or more implementations.
Figure 2B:
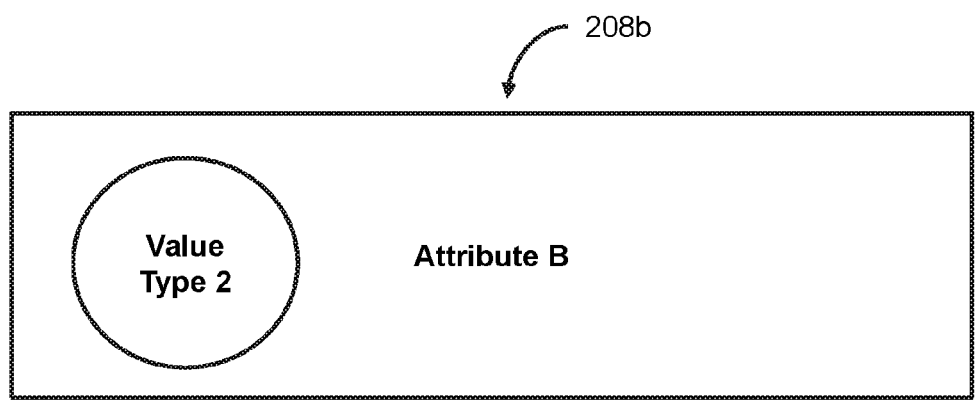

For example, FIG. 2A illustrates an exemplary diagram of a user interface 200 for facilitating real-time data visualization of streaming data, in accordance with one or more implementations. As shown, user interface 200 may include portions 202, 204, and 206. Portion 202 may include control elements 208. Each of the control elements 208 may be represent an attribute of a plurality of attributes. As shown by FIG. 2B, for instance, control element 208a may represent Attribute A that is associated with a value type 1 (e.g., general number, currency, target, or other types), and control element 208b may represent Attribute B that is associated with a value type 2 (e.g., general number, currency, target, or other types).

Figure 2C:
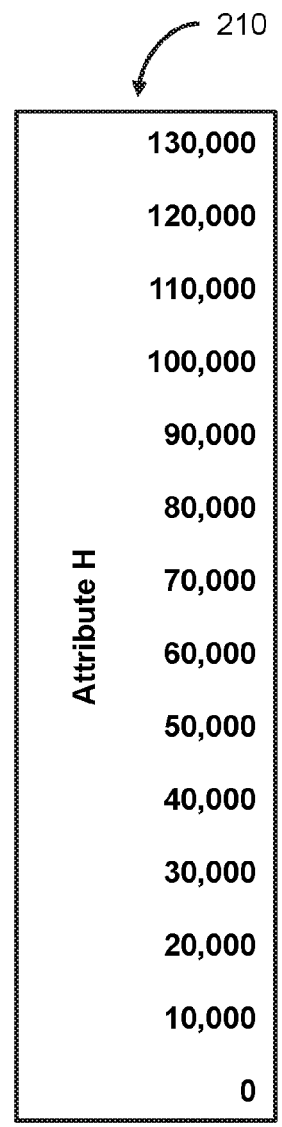
Figure 2D:
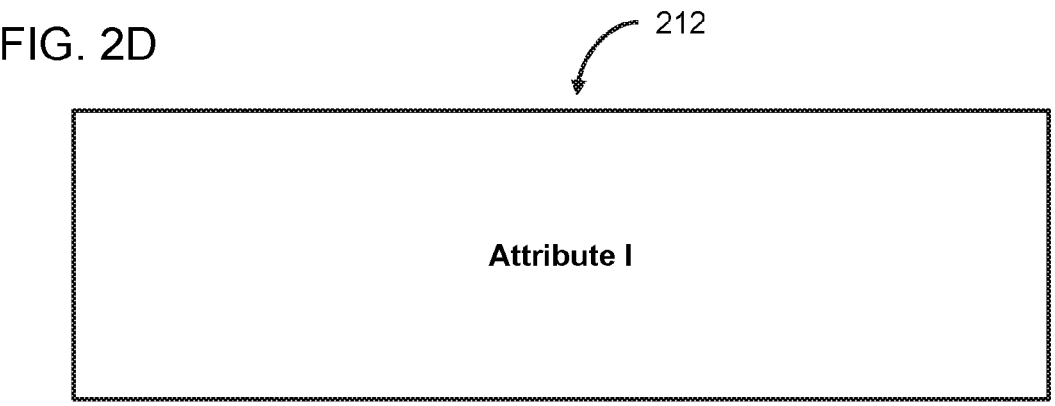

Portion 204 may include axis information sections 210 and 212, along with data elements 214. Data elements 214 may be associated with at least one attribute. Attributes associated with data elements 214 may, for instance, be indicated in axis information sections 210 and 212. Each of the data elements 214 may represent a value associated with an attribute indicated in at least one of axis information sections 210 and 212. As shown by FIG. 2C, axis information section 210 may indicate Attribute H along with values associated with Attribute H (e.g., overall revenue or other attribute). As shown by FIG. 2D, axis information section 212 may indicate Attribute I (e.g., product category or other attribute). Referring back to FIG. 2A, a user may swipe, zoom-in or zoom-out, filter, or perform other actions on portion 204 of user interface 200 to explore other available data elements 214 that may not currently be in the viewable area of portion 204 or initiate requests for other data elements.

In one scenario, with respect to FIG. 2A, attributes relating to product sales may include product category, product group, product satisfaction, stock-keeping unit (SKU), transaction time, user city, user state, user gender, user income, volume, overall revenue, average revenue, or other attributes. As an example, Table 1 below may represent attributes (e.g., first row) and values associated with the attributes (e.g., other rows) that may be streamed in real-time prior to processing of the data stream by a stream processing engine.

TABLE 1

| Transaction # | Product Category | Product Price | ... |
|---|---|---|---|
| 0054454031 | Women's Watch | $300.00 | ... |
| 0054454032 | Ring | $250.00 | ... |

TABLE 1-continued

| Transaction # | Product Category | Product Price | ... |
|---|---|---|---|
| 0054454033 | Bracelet | $350.00 | ... |
| 0054454034 | Men's Watch | $350.00 | ... |
| ... | ... | ... | ... |

If, for example, data elements 214 are associated with the product category attribute and the overall revenue attribute, the overall revenue values for each of the product category values (e.g., women's watch, ring, bracelet, men's watch, etc.) may be calculated by a stream processing engine based on the product price values corresponding to product sales for a certain time period (e.g., current day, week, month, year, etc.). In one use case, data element 214a may represent the overall revenue from sales of women's watches for the current year thus far, data element 214b may represent the overall revenue from sales of rings for the current year thus far, data element 214c may present the overall revenue from sales of bracelets for the current year thus far, data element 214d may present the overall revenue from sales of men's watches for the current year thus far, and so on. The set of data elements 214 may be updated continuously to represent the most up-to-date overall revenue values for each of the product category values (e.g., calculated based on product price values corresponding to recent product sales during the certain time period) and/or the most update-to-date set of product category values (e.g., a new data element 214 may be added to the set of data elements 214 to represent overall revenue from product sales of a product category that the company recently started selling).

In another use case, data visualization module 108 may determine how to handle new/unknown attributes, existing attributes, new/unknown values, existing values, or other information based on crowd sourcing. User actions may, for instance, be monitored by one or more modules (e.g., crowd sourcing module or other module) of system 100 to determine data dependencies (e.g., which attributes are frequently looked at hierarchically by users, which sources are frequently combined together by users, etc.), similarities among attributes, values, etc. (e.g., which attributes are frequently grouped together), users with expertise in certain domains (e.g., indicating users that are to be prompted by system 100 to inquiry on how to handle new/unknown information), or other information.

Still referring to FIG. 2A, portion 206 may include a pause/play button 216 for pausing or playing the data visualization, an indicator 218 specifying that the data visualization is live data, and a sliding-based control element 220 having a movable control element 222 for rewinding to visualize historical data, fast-forwarding back to visualizing live data, fast-forwarding to visualize predictions of future data, etc. As shown by indicator 218, the data visualization that is depicted in portion 204 may represent live data. A user may, for example, slide movable control element 222 to the left on sliding-based control element 220 to switch the data visualization of the live data to a data visualization of historical data.

In another scenario, with respect to FIG. 2E, a user may modify the view of user interface 200 (e.g., changing the view of a bar chart to one of a bubble chart) such that portion 204 presents data elements 224 in lieu of data elements 214 (which are shown in FIG. 2A). Individual ones of data elements 224 may correspond to individual ones of data elements 214. Data element 224a may correspond to data element 214a, data element 224b may correspond to data element 214b, data element 224c may correspond to data element 214c, and so on. For example, referring to FIGS. 2A and 2E, data elements 214a and 224a may each represent the product category value "Women's Watch" associated with the product category attribute and the overall revenue value "$120,000" associated with the overall revenue attribute. Data elements 214b and 224b may each represent the product category value "Ring" associated with the product category attribute and the overall revenue value "$95,000" associated with the overall revenue attribute. As shown, data elements 214 of FIG. 2A may represent the individual overall revenue values of the different product categories by the individual heights of the data elements 214 (e.g., a higher bar may indicate higher overall revenue). On the other hand, data elements 224 of FIG. 2E may represent the individual overall revenue values of the different product categories by the individual sizes of the data elements 214 (e.g., a larger circle may indicate higher overall revenue).

Figure 2F:
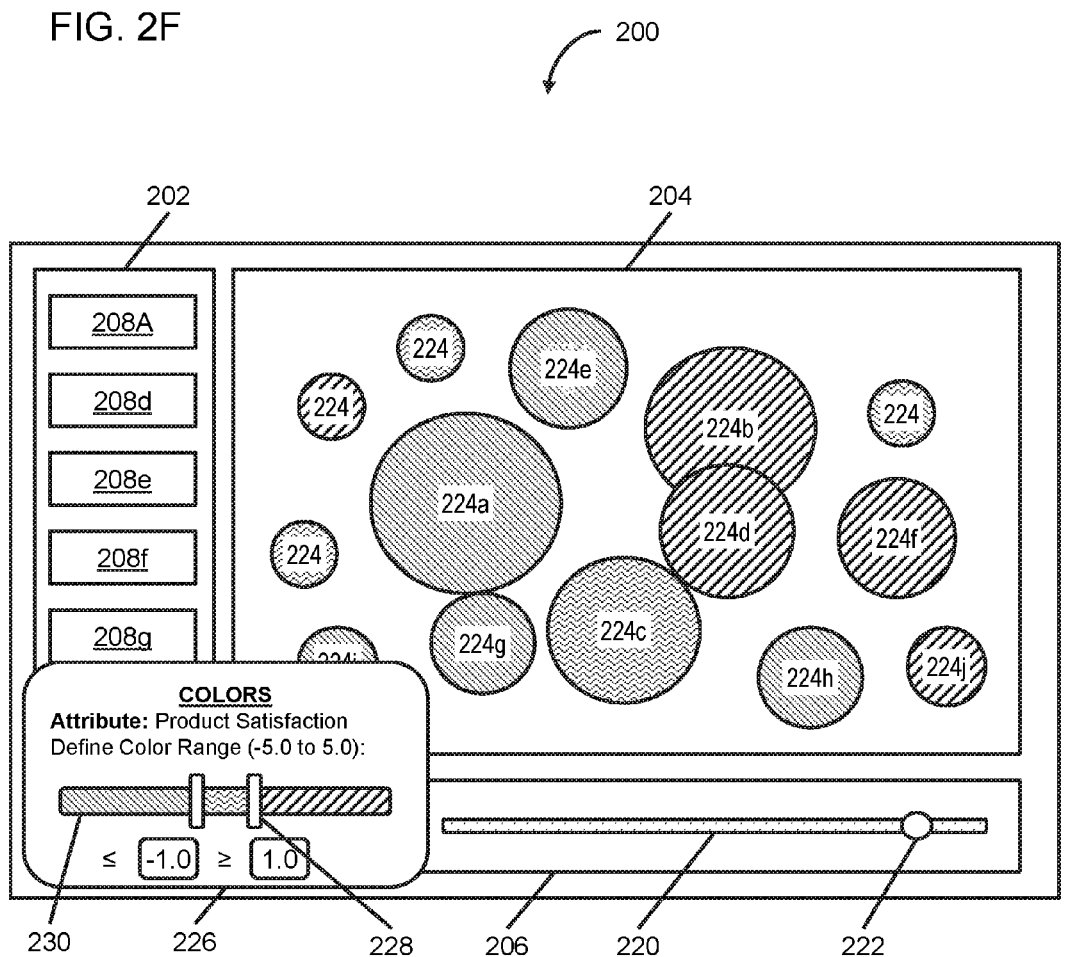

Referring to FIG. 2F, a user may cause data elements 224 to simultaneously represent values associated with an additional attribute (e.g., using other user interface control elements (not shown for illustrative convenience)). As an example, the user may activate window 226 to utilize color to represent values associated with the additional attribute. In this case, the values to be further represented by data elements 224 through the use of different colors may be product satisfaction values associated with the product satisfaction attribute. As shown, in this example, the user may utilize moveable control elements 228 on sliding-based control element 230 to define the value ranges for each of the different colors (which are illustrated as different patterns on FIG. 2F) that will be reflected by data elements 224. As depicted, the first color on the left side of the sliding-based control element 230 represents product satisfaction values between and including −5.0 and −1.0. The second color in the middle of the sliding-based control element 230 represents product satisfaction values between −1.0 and 1.0. The third color in the right side of the sliding-based control element represents product satisfaction values between and including 1.0 and 5.0. For example, data elements 224 may indicate that, for a particular data set, women's watches (e.g., represented by data element 224a) are generally given a low product satisfaction rating compared to other products, and rings (e.g., represented by data element 224b) are generally given a high product satisfaction rating compared to other products.

As shown by FIG. 2G, a user may cause data elements 224 to simultaneously present values associated with further attributes (e.g., using other user interface control elements (not shown for illustrative convenience)). As an example, based on a selection or other user trigger, the user may cause data elements 224 to further represent the average income of consumers purchasing a particular product category based on the x-axis position of a given data element 224 and the average price of products in the product category based on the y-axis position of the given data element 224 (e.g., greater x-axis position may represent a higher average income, greater y-axis position may represent a high average price, etc.). Thus, the attributes and/or the attribute values may drive the color, size, x-axis and y-axis positions, labels, or other features of data elements 224, for instance, as the attributes and/or the attribute values represented by data elements 224 are dynamically updated based on continuous streaming of data (e.g., from a single source, from multiple sources, etc.).

Figure 2H:
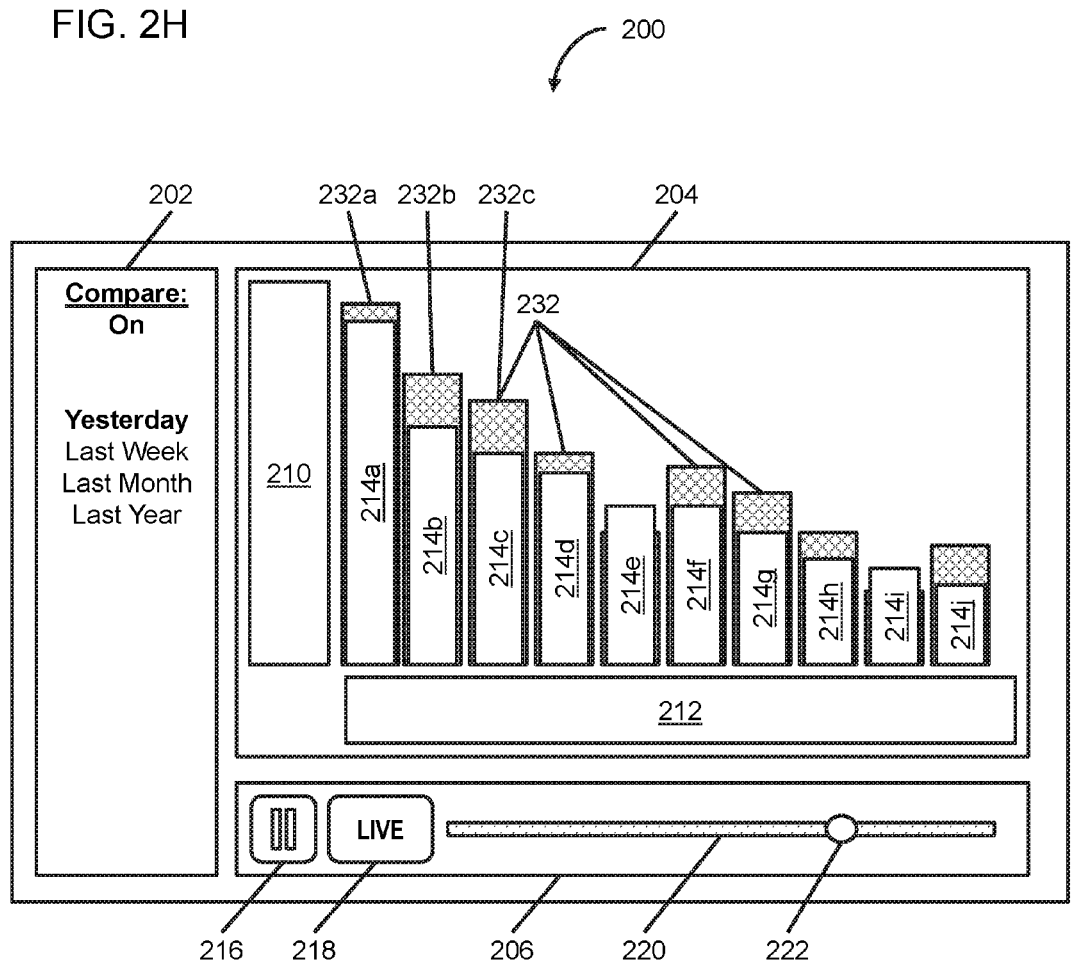

In another scenario, with respect to FIG. 2H, a user may modify the view of user interface 200 such that portion 204 simultaneously presents data elements 214 representing live up-to-date data along with data elements 232 representing historical data. As an example, FIG. 2H may illustrate joining data based on time to generate data visualizations. In one use case, for instance, data elements 214 and data elements 232 may be associated with the same attributes (e.g., the attribute "Product Category" or other attribute). However, data elements 214 may represent values that correspond to the current day, while data elements 232 may represent values that correspond to a previous day (e.g., one day before the current day). Data element 214a may, for instance, represent the overall revenue from sales of women's watches for the current day up until the current time. Data element 232a may represent the overall revenue from sales of women's watches for the previous day up until a reference time corresponding to the current time. As data elements 214 are updated to reflect the current time, data elements 232 may be updated to reflect a reference time that corresponds to the current time.

Figure 2I:
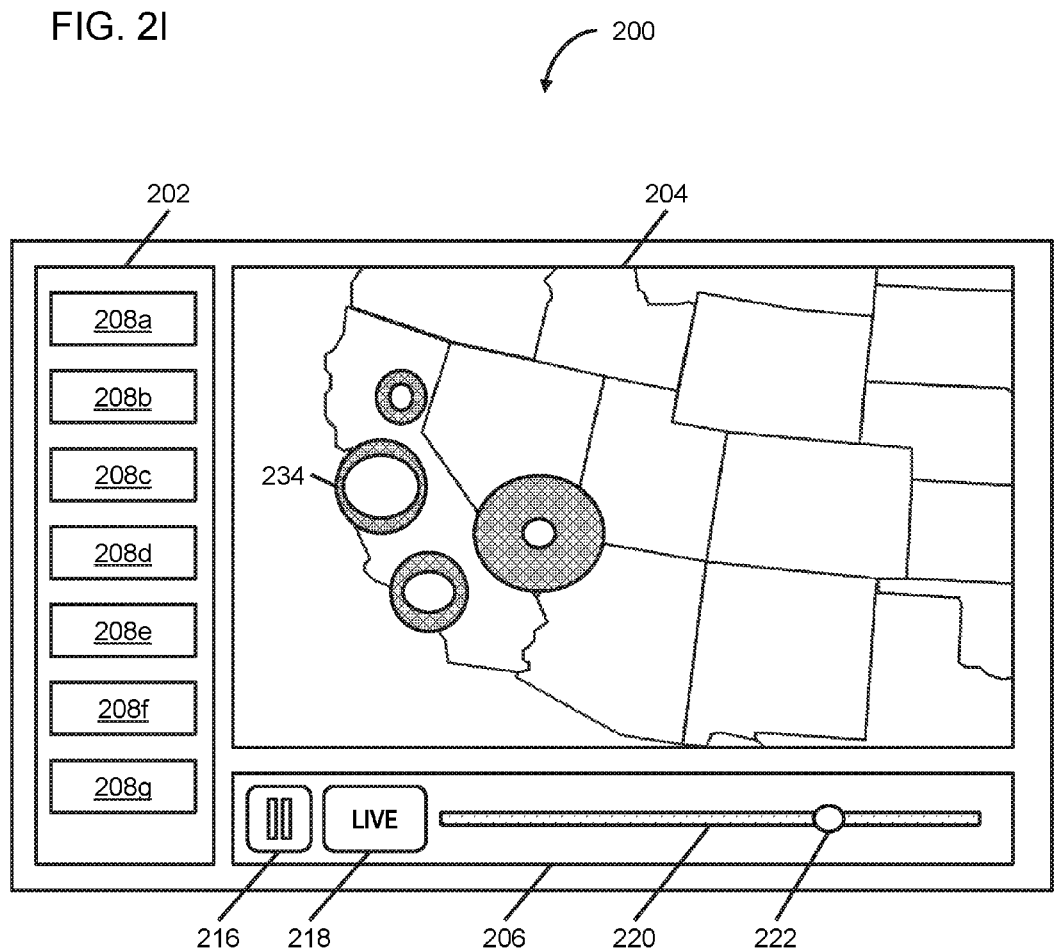
Figure 2J:
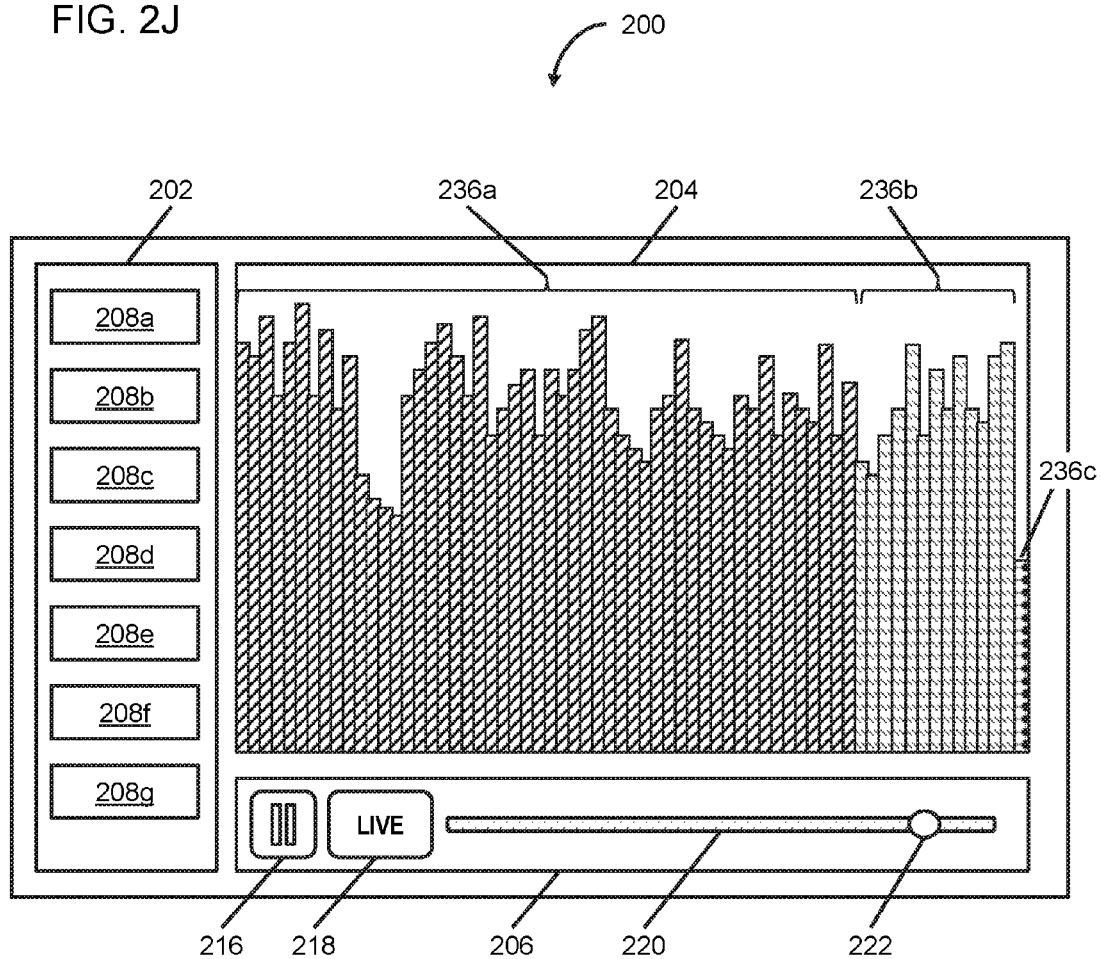

In some scenarios, different types of data may be joined based on any number or criteria (e.g., time, geography, or other criteria), and visualization of the joined data may be presented using any number of approaches. As an example, with respect to FIG. 2I, data regarding the number of pizzas ordered and the number of tweets may be joined based on geographic area by data visualization module 108 as tweet-related data and the pizza-related data are streamed in and received by data visualization module 108. Upon joining, data visualization module 108 may generate data elements 234 to represent the join data. Data elements 234 may, for instance, represent the number of pizzas ordered compared to the number of tweets in one or more geographical areas. As indicated, one of the data elements 234 may represent the pizza/tweet numbers in an area in northern California, one of the data elements 234 may represent the pizza/tweet numbers in an area in central California, one of the data elements 234 may represent the pizza/tweet numbers in an area in southern California, and one of the data elements 234 may represent the pizza/tweet numbers in an area in southern Nevada.

In this example, the number of tweets in a geographic area may be represented by the overall size of the data element 234 corresponding to the geographic area where larger data elements 234 represent more tweets in corresponding geographic areas than smaller data elements 234. The number of pizzas ordered in a geographic area may be represented by a sub-element (e.g., the white portion) within the data element 234 corresponding to the geographic area where the size of the sub-element within the data element 234 represents a ratio of the number of tweets vs. the number of pizzas ordered in the geographic area. If, for instance, the size of the sub-element is one-fourth the overall size of the data element 234, the represented ratio may be 1000 tweets to 25 pizzas ordered in the geographic area. On the other hand, if the size of the sub-element is the same as the overall size of the data element 234, the represented ratio may be 10 tweets to 1 pizza ordered.

As shown, data elements 234 may indicate that there are substantially more tweets in the area in southern Nevada (e.g., Las Vegas) than the area in northern California, and that the ratio of tweets to pizzas ordered in the area in southern Nevada is substantially greater than the ratio of tweets to pizzas ordered in the area in northern California. Data elements 234 may also indicate that there are more tweets in the area in central California than the area in southern California, but that the ratio of tweets to pizzas ordered in the area in central California is substantially less than the ratio of tweets to pizzas ordered in the area in southern California. Thus, in this example, the overall size of a given data element 234 for a geographic area may be based on the number of tweets in the geographic area and may not be based on the number of pizzas ordered in the geographic area. On the other hand, the size of the sub-element within the data element 234 may be based on both the number of tweets in the geographic area and the number of pizzas ordered in the geographic area (e.g., a result of being based on the ratio of tweets vs. pizzas ordered).

In another scenario, with respect to tweets and pizzas, data elements presented on a user interface may indicate the ratio of the number of tweets vs. the number of pizzas ordered in one or more geographic areas without actually indicating the absolute number of tweets or the absolute number of pizzas ordered. For example, the sizes of two different data elements corresponding to two geographic areas may be approximately the same size on the user interface because the tweet/pizza ratios are approximately the same in the two geographic areas. As such, even though there may be substantially more tweets in one area vs. the other area, or substantially more pizzas ordered in one area vs. the other area, the data elements corresponding to the two areas may still be roughly the same size.

In another scenario, user interface 200 may allow users to save visualizations shown by FIG. 2A, 2E, 2F, 2G, 2H, 2I, or 2J (or other visualizations) and securely share them with others. Once shared, the other users may view the visualizations, manipulate the visualizations, or even create new visualizations and share the new visualizations with others.

Input module 112 may be configured to receive a first touch-based input indicating an association of a first one of the individual control element (provided in the second portion of the user interface) with a first one of the individual first data elements (provided in the first portion of the user interface). Data visualization module 108 may be configured to provide a second data element set associated with a second attribute in the first portion of the user interface responsive to the association indicated by the first touch-based input. The second attribute associated with the second data element set may be different than the first attribute associated with the first data element set. The second attribute may be the attribute represented by the first one of the individual control elements. The second data element set may include individual second data elements. Each of the individual second data elements may represent a second value that is associated with the second attribute and that correspond to the first value represented by the first one of the first individual data elements.

In some implementations, the association indicated by the first touch-based input may correspond to dragging the first one of the individual control elements onto the first one of the individual first data elements or dragging the first one of the individual first data elements onto the first one of the individual control elements. In one scenario, with respect to FIG. 2A, control element 208a may represent the attribute "User City," and the other control elements 208 may represent other attributes relating to product sales (e.g., product category, product group, product satisfaction, stock-keeping unit (SKU), transaction time, user state, user gender, user income, volume, overall revenue, average revenue, or other attributes). Data element 214a may represent the product category value "Women's Watch" associated with the product category attribute and the overall revenue value "$120,000" associated with the overall revenue attribute. The other data elements 214 may represent other product category values associated with the product category attribute and other overall revenue values associated with the overall revenue attribute.

If, for example, a user touches and drags control element 208a (e.g., representing the user city attribute) onto data element 214a (e.g., representing the product category value "Women's Watch" and the overall revenue value $120,000), information relating to the product category value "Women's Watch" may be queried based on the user city attribute. In one use case, a request may be initiated for data elements that are associated with the user city attribute and the overall revenue attribute, and that correspond to the product category value "Women's Watch." The overall revenue values from sales of women's watches in each of the cities that correspond to user city values (e.g., New York, Los Angeles, Chicago, Houston, Philadelphia, Phoenix, San Diego, etc.) associated with the user city attribute may, for instance, be calculated by a stream processing engine for a certain time period (e.g., current day, week, month, year, etc.). The requested data elements may represent the overall revenues from sales of women's watches in each of the cities for the certain time period thus far. For example, a first one of the requested data elements may represent the overall revenue from sales of women's watches in New York for the certain time period thus far, a second one of the requested data elements may represent the overall revenue from sales of women's watches in Los Angeles for the certain time period thus far, a third one of the requested data elements may represent the overall revenue from sales of women's watches in Chicago for the certain time period thus far, and so on. Upon generation of the requested data elements, the requested data elements may be provided in portion 204 of user interface 200. In this way, among other benefits, system 100 may allow users to visualize information relating to one or more particular data elements or other elements, for example, via touch-based interactions.

In certain implementations, the first touch-based input may indicate another association of the first one of the individual control elements with a second one of the individual first data elements. In one or more implementations, the other association indicated by the first touch-based input may correspond to dragging the first one of the individual control elements onto the second one of the individual first data elements or dragging the second one of the individual first data elements onto the first one of the individual control elements. Responsive to the other association indicated by the first touch-based input, data visualization module 108 may provide a third data element set associated with the second attribute (of the second data element set) in the first portion of the user interface with the second data element set. The third element set may include individual third data elements. Each of the individual third data elements may represent a second value associated with the second attribute and correspond to the first value represented by the second one of the first individual data elements.

By way of example, with respect to FIG. 2A, control element 208a may represent the attribute "User City." Data element 214a may represent the product category value "Women's Watch" associated with the product category attribute and the overall revenue value "$120,000" associated with the overall revenue attribute. Data element 214b may represent the product category value "Ring" associated with the product category attribute and the overall revenue value "$95,000" associated with the overall revenue attribute. In one use case, a user may touch and drag control element 208a onto both data elements 214a and 214b, for instance, by hovering control element 208a over data element 214a for a predetermined amount of time without releasing control element 208a and then releasing control element 208a onto data element 214b. Such user action may cause information relating to the product category values "Women's Watch" or "Ring" to be queried based on the user city attribute.

In a further use case, a request may be initiated for data elements that are associated with the user city attribute and the overall revenue attribute, and that correspond to the product category values "Women's Watch" or "Ring." The overall revenue values from sales of women's watches and rings in each of the cities corresponding to the user city values (e.g., New York, Los Angeles, Chicago, Houston, Philadelphia, Phoenix, San Diego, etc.) may, for instance, be calculated by a stream processing engine for a certain time period. The requested data elements may represent the overall revenues from sales of women's watches and rings in each of the cities for the certain time period thus far. For example, a first one of the requested data elements may represent the overall revenue from sales of women's watches and rings in New York for the certain time period thus far, a second one of the requested data elements may represent the overall revenue from sales of women's watches and rings in Los Angeles for the certain time period thus far, a third one of the requested data elements may represent the overall revenue from sales of women's watches and rings in Chicago for the certain time period thus far, and so on. Upon generation of the requested data elements, the requested data elements may be provided in portion 204 of user interface 200.

In various implementations, data visualization module 108 may be configured to determine that the second attribute is the attribute represented by the first one of the individual control elements responsive to the association indicated by the first touch-based input. Data visualization module 108 may be configured to provide the second data element set in the first portion of the user interface responsive to determining that the second attribute is the attribute represented by the first one of the individual control elements. By way of example, with respect to FIG. 2A, control element 208a may represent the attribute "User City." Data element 214a may represent the product category value "Women's Watch" associated with the attribute "Product Category," and the overall revenue value "$120,000" associated with the attribute "Overall Revenue." When a user selects control element 208a by dragging control element 208a, the user city attribute may be determined as the attribute represented by control element 208a. When the user drops control element 208a onto data element 214a, information relating to the product category value "Women's Watch" may be queried based on the determined user city attribute.

In some implementations, input module 112 may be configured to receive a second touch-based input indicating a zoom operation relating to a first one of the individual second data elements (of the second data element set). Data visualization module 108 may be configured to provide, in the first portion of the user interface, a third data element set associated with a third attribute different than the second attribute responsive to the zoom operation indicated by the second touch-based input. The third data element set may include individual third data elements. Each of the individual third data elements may represent a third value associated with the third attribute.

In certain implementations, the zoom operation may comprise a zoom-in operation. Responsive to determining that the zoom operation comprises the zoom-in operation, data visualization module 108 may be configured to provide the third data element set in the first portion of the user interface such that each of the individual third data elements of the third data element set corresponds to the first value represented by the first one of the individual first data elements (of the first data element set) and the second value represented by the first one of the individual second data elements (of the second data element set).

In one scenario, with respect to FIG. 2A, dragging of control element 208a (e.g., representing the attribute "User City") onto data element 214a (e.g., representing the product category value "Women's Watch" associated with the product category attribute) may trigger initiation of a request for data elements that are associated with the user city attribute and that correspond to the product category value "Women's Watch." The requested data elements may, for example, represent the overall revenues from sales of women's watches in each of the cities corresponding to the user city values (e.g., New York, Los Angeles, Chicago, Houston, Philadelphia, Phoenix, San Diego, etc.) for the certain time period thus far. Upon generation of the requested data elements, the requested data elements may be provided in portion 204 of user interface 200.

In another scenario, the user may perform a zoom-in gesture on a particular one of the requested data elements (e.g., representing one of the user city values). If, for instance, the user performs a zoom-in gesture on the particular one of the requested data elements, a further request for data elements that are associated with an attribute different than the user city attribute and the product category attribute, and that correspond to the product category value "Women's Watch" and the user city value represented by the particular one of the requested data elements. For example, the further requested data elements (e.g., that is provided in portion 204 responsive to the performed zoom-in gesture) may represent the number of men and the number of women that purchased women's watches in New York for the certain time period thus far. In this way, among other benefits, the user may "zoom-in" on a particular data element to view additional details based on different attributes.

In some implementations, the zoom operation comprises a zoom-out operation. Responsive to determining that the zoom operation comprises the zoom-out operation, data visualization module 108 may be configured to such that the third attribute is the first attribute associated with the first data element set. With respect to the above scenario, the user may perform a zoom-out gesture in lieu of performing the zoom-in gesture. In one use case, the zoom-out gesture may trigger a further request for data elements that are associated with the product category attribute. For example, the further requested data elements (e.g., that is provided in portion 204 responsive to the performed zoom-out gesture) may include one or more of data elements 214 or updated versions of data elements 214.

In various implementations, data visualization module 108 may be configured to determine that the third attribute (associated with the third data element set) is hierarchically lower or higher than the second attribute responsive to the zoom operation indicated by the second touch-based input. Data visualization module 108 may be configured to, responsive to determining that the third attribute is hierarchically lower or higher than the second attribute, provide the third data element set in the first portion of the user interface based on the third data element set being associated with the third attribute. As an example, attributes may be hierarchically arranged such that zoom-in operations may trigger a request for further information relating to one or more values represented by data elements of a currently-presented data element set based on attributes that are hierarchically lower than an attribute associated with the currently-presented data element set. As another example, attributes may be hierarchically arranged such that zoom-out operations may trigger a request for broader information than what is provided by a currently-presented data element set based on attributes that are hierarchically higher than an attribute associated with the current-presented data element set.

With respect to the above zoom-in operation scenario, for instance, a hierarchical structure may indicate that the user gender attribute is associated with a hierarchical level lower than the user city attribute. As such, the data elements representing the number of men and the number of women that purchased women's watches in New York during a certain time period may be presented in portion 204 of user interface 200 (e.g., in response to the zoom-in gesture performed in the above zoom-in operation scenario) based on the determination that the user gender attribute is a hierarchical level lower than the user city attribute.

With respect to the above zoom-out operation scenario, for instance, a hierarchical structure may be modified to indicate that the product category attribute is a hierarchical level higher than the user city attribute when control element 208a (e.g., representing the attribute "User City") is dragged onto data element 214a (e.g., representing the product category value "Women's Watch" associated with the product category attribute). Thus, one or more data elements 214 or updated versions of data elements 214 may be presented in portion 204 of user interface 200 (e.g., in response to the zoom-out gesture performed in the above zoom-out operation scenario) based on the determination that the product category attribute is a hierarchical level higher than the user city attribute.

In certain implementations, query module 116 may be configured to perform queries relating to the second attribute (associated with the second data element set) responsive to the association (of the first one of the individual control elements of the control element set with the first one of the individual first data elements of the first data element set) indicated by the first touch-based input. Query module 116 may be configured to receive individual subsets of data relating to the second values (represented by the individual second data elements of the second data element set). Data visualization module 108 may be configured to predict at least some of the second values using the individual subsets of data based on a determination that other subsets of data relating to the at least some of the second values have not yet been received. Data visualization module 108 may be configured to generate the individual second data elements (of the second data element set) based on the prediction. The second data element set may be provided based on the generated individual second data elements.

By way of example, micro-query delegation may be performed to enable faster real-time results of large streaming data by performing numerous micro-queries on a distributed data store. An approximation of the final data values may be performed based on results from a subset of the micro-queries that are completed by extrapolating from the resulting data that has been processed thus far to estimate the final data values before all of the micro-queries are completed. Data elements may be generated based on the approximated data values to present users with approximated visualized information without having to wait for all of the micro-queries to be completed. Upon completion of all the micro-queries or a determination that no further results is to be received in response to any further micro-queries, the final data values may be calculated and then utilized to generate data elements based on the final data values to replace the approximated data elements, thereby "sharpening" the data elements. In this way, among other benefits, user experience may be improved by providing users with visualized information representing final data values without having to wait for all of the results from the micro-queries to be received by predicting what the final data values will likely be based on results from a subset of the micro-queries that have been received. In one scenario, the visualized information generated based on the approximated data values may provide a user with sufficient information to determine his/her next action, thereby reducing unnecessary waste of time. The user may, for instance, interrupt the "sharpening" process (e.g., replacement of the approximated data elements with further approximations or data elements generated based on a full set of results) by performing his/her next action (e.g., zooming-in, changing an attribute begin displayed, using a sliding time bar to change a time of the data to be presented, etc.). The interruption may terminate further processing of the remaining micro-queries whose results are no longer needed, thereby saving processing resources.

In some implementations, data visualization module 108 may be configured to provide, in a first portion of a user interface, a first data element set that includes individual first data elements representing first values associated with at least one attribute. Control interface module 110 may be configured to provide, in a second portion of the user interface, a sliding-based control element that includes a moveable control element and points associated with times. Data visualization module 108 may be configured to dynamically update the provided first data element set in real-time responsive to real-time streaming of data from a plurality of sources. The provided first data element set may be dynamically updated such that the individual first data elements represent dynamically updated values of the first values in lieu of the first values. As an example, with respect to FIGS. 2A and 2E, data elements 214 and/or 224 may continuously change in appearance to reflect updated values as data is continuously streamed from the plurality of sources. The sources may comprise internal sources (e.g., intranet, database, file stores, Hadoop Distributed File System (HDFS), local area network, etc.) and/or external sources (e.g., Internet, external data stores, APIs, third-party sources, etc.).

Input module 112 may be configured to receive a first touch-based input indicating moving of the movable control element (of the sliding-based control element) to a first one of the points that is associated with a first one of the times. Switch module 114 may be configured to, responsive to the moving of the movable control element indicated by the first touch-based input, determine whether to stream data from a temporary data cache or a historical data store to obtain second values that are associated with the at least one attribute and that correspond to the first one of the times. Data visualization module 108 may be configured to obtain the second values based on the determination of whether to stream data from the temporary data cache or the historical data store.

By way of example, real-time data may be streamed from the plurality of sources (e.g., internal or external sources) and storage of the streamed data may occur at both the temporary data cache and the historical data store. The streamed data may, for example, be stored at the temporary data cache for a predetermined period of time, while the streamed data may be stored at the historical data store for an indefinite period of time or otherwise a substantially longer predetermined period of time than the temporary data cache. On the other hand, storage of the streamed data may be performed faster at the temporary data cache than storage of the streamed data at the historical data store. Switch module 114 may, for example, intelligently determine whether to stream data from the temporary data cache or the historical data store to obtain historical data for generating data elements representing values that relate to the historical data based on the data to be streamed, the time associated with the second values, or other criteria.

In one use case, with respect to FIG. 2A, data elements 214 may represent the first values that are associated with the at least one attribute (e.g., the attribute "Product Category" or other attributes). The first values may, for example, include the most up-to-date values for a certain time period thus far (e.g., a current day, week, month, year, etc.). Upon moving of movable control element 222 toward the left along sliding-based control element 220 onto a point associated with a particular time, a request for data elements that are associated with the at least one attribute and that correspond to the particular time may be initiated. As an example, switch module 114 may determine to stream data from the historical data store to obtain data necessary for determining values that are to be represented by the requested data elements.

It should be noted that, in some scenarios, switch module 114 may determine to stream data from two or more of a real-time store (e.g., reflecting data streams associated with the most up-to-date from a plurality of sources), a temporary data cache (e.g., storing data for a short-term period), and a historical data store (e.g., storing data for a long-term period or indefinitely) to generate a data visualization. For example, with respect to FIG. 2J, data elements 236 may represent data values for each minute in the last 60 minutes where the rightmost data element 236c represents data values for the current minute. Data elements 236a may be generated (e.g., by data visualization module 108) based on data streamed from at least a historical data store. Data elements 236b may be generated based on data streamed from at least a temporary data cache. Data element 236c may be generated based on data from at least a real-time store. In one use case, data element 236c may continue to grow in height as data is continuously streamed in from one or more sources to reflect the most up-to-date data in real-time.

Data visualization module 108 may be configured to provide, in the first portion of the user interface, a second data element set that includes individual second data elements representing the obtained second values (that are associated with the at least one attribute and that correspond to the first one of the times).

In certain implementations, the first one of the times may correspond to a time of a recent dynamic update of the provided first data element set. By way of example, with respect to FIG. 2H, movable control element 222 may be moved to a point associated with the same reference minute, the same hour, etc., during the previous day as the most recent update of the provided first data element set that includes data elements 214 (e.g., the point may be associated with 2 PM for the previous day while the most recent update was performed at 2 PM on the current day).

In some implementations, data visualization module 108 may be configured to dynamically update the provided second data element set responsive to streaming of data from the historical data store. The provided second data element set may, for example, be dynamically updated such that the individual second data elements represent dynamically updated values of the second values in lieu of the second values. Data visualization module 108 may be configured to simultaneously provide, in the first portion of the user interface, the dynamically updated first data element set and the dynamically updated second data element set. The dynamically updated first data element set may correspond to a first time period. The dynamically updated second data element set may correspond to a second time period different than the first time period. The dynamically updated first data element set and the dynamically updated second data element set may continuously correspond to a same reference point of time of the first time period and the second time period.

By way of example, with respect to FIG. 2H, data elements 214 and data elements 232 may be associated with the same attributes (e.g., the attribute "Product Category" or other attribute). However, data elements 214 may represent values that correspond to the current day, while data elements 232 may represent values that correspond to a previous day (e.g., one day before the current day). As an example, data element 214a may represent the overall revenue from sales of women's watches for the current day up until the current time. Data element 232a may represent the overall revenue from sales of women's watches for the previous day up until a reference time corresponding to the current time. As data elements 214 are updated to reflect the current time, data elements 232 may be updated to reflect a reference time that corresponds to the current time. In one use case, the simultaneous presentation of data elements 214 and 232 may be based on a comparison mode being activated and/or the moving of the movable control element 222 to a particular point along sliding-based control element 220. In another use case, the simultaneous presentation may be based on the comparison mode being activated and/or the selection of one of the options (e.g., "Yesterday," "Last Week," "Last Month," "Last Year," etc.) depicted in portion 202 of user interface 200. In this way, among other benefits, users may compare real-time data with corresponding historical baselines.

As discussed above, while FIG. 2H may illustrate joining data together based on time to generate data visualizations, data streams of the same or different types may be joined based on any number of criteria (e.g., time, geography, or other criteria) to generate data visualizations relating to one or more of the data streams.

In various implementations, query module 116 may be configured to perform queries relating to the at least one attribute (associated with the first data element set) on the historical data store responsive to a determination to stream data from the historical data store. Query module 116 may be configured to receive individual subsets of data relating to the second values (that are associated with the at least one attribute and that correspond to the first one of the times) responsive to performing of the queries. Data visualization module 108 may be configured to predict at least some of the second values using the individual subsets of data based on a determination that other subsets of data relating to the at least some of the second values have not yet been received. Data visualization module 108 may be configured to generate the individual second data elements based on the prediction. The second data element set may be provided based on the generated individual second data elements.

In one scenario, micro-query delegation may be performed to enable faster real-time results of large streaming data by performing numerous micro-queries on a distributed data store (e.g., the historical data store or other data store). An approximation of the final data values may be performed based on results from a subset of the micro-queries that are completed by extrapolating from the resulting data that has been processed thus far to estimate the final data values before all of the micro-queries are completed. Data elements may be generated based on the approximated data values to present users with approximated visualized information without having to wait for all of the micro-queries to be completed. Upon completion of all the micro-queries or a determination that no further results is to be received in response to any further micro-queries, the final data values may be calculated and then utilized to generate data elements based on the final data values to replace the approximated data elements, thereby "sharpening" the data elements.

It is understood that various features (e.g., components, operations, or other features) described herein may be implemented separately or in combination with other features. As an example, swipe, pinch, zoom-in or zoom-out, drag-and-drop, rotate, or other operations described herein may be implemented separately or in combination with other features. As another example, retrieval of data from multiple data stores (e.g., real-time stores, temporary data cache, historical data store, or other data store), sharpening of data visualizations, or other operations described herein may be implemented separately or in combination with other features (e.g., the abilities to swipe, pinch, zoom-in or zoom-out, drag-and-drop, or rotate).

It should be noted that, although various examples may be described herein with respect to touch-based inputs, it is understood that one or more implementations disclosed herein may utilize other types of input (e.g., voice inputs, keyboard inputs, mouse inputs, etc.) in addition to or in lieu of touch-based inputs. It should also be noted that, although various examples may be described herein with respect to attributes relating to product sales, it is understood that one or more implementations disclosed herein may utilize other types of attributes (e.g., attributes relating to social networking, attributes relating to information states, attributes relating to manufacturing, or other attributes) in addition to or in lieu of attributes relating to product sales.

User device 104 may comprise any type of mobile terminal, fixed terminal, and/or other device. For example, user device 104 may comprise a desktop computer, a notebook computer, a netbook computer, a tablet computer, a smartphone, a navigation device, an electronic book device, a gaming device, and/or any other user device. In some implementations, user device 104 may comprise the accessories and peripherals of these devices. User device 104 may also support any type of interface to the user (such as "wearable" circuitry, etc.).

Communication network 106 of system 100 may comprise one or more networks such as a data network, a wireless network, a telephony network, and/or other communication networks. A data network may comprise any local area network (LAN), metropolitan area network (MAN), wide area network (WAN), a public data network (e.g., the Internet), short range wireless network, and/or any other suitable packet-switched network. The wireless network may, for example, comprise a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), etc.).

In some implementations, server 102 may include an electronic storage 118, one or more processors 120, and/or other components. Server 102 may include communication lines, or ports to enable the exchange of information with network 106 and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from user devices 104, and/or other information that enables server 102 to function as described herein. In some implementations, electronic storage may comprise a non-transitory, tangible computer-readable storage medium with an executable program stored thereon, wherein the program instructs a microprocessor to perform some or all of the functionality of modules 106, 108, 110, 112, 114, 116, and/or other modules.

Processor 120 may be configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. Processor 120 may be configured to execute modules 106, 108, 110, 112, 114, 116, and/or other modules. Processor 120 may be configured to execute modules 106, 108, 110, 112, 114, 116, and/or other modules by software; hardware; firmware; some combination of software, hardware, and/or firmware; and/or other mechanisms for configuring processing capabilities on processor 120.

It should be appreciated that although modules 106, 108, 110, 112, 114, and 116 are illustrated in FIG. 1 as being co-located within a single processing unit, in implementations in which processor 120 includes multiple processing units, one or more of modules 106, 108, 110, 112, 114, and/or 116 may be located remotely from the other modules. The description of the functionality provided by the different modules 106, 108, 110, 112, 114, and/or 116 described below is for illustrative purposes, and is not intended to be limiting, as any of modules 106, 108, 110, 112, 114, and/or 116 may provide more or less functionality than is described. For example, one or more of modules 106, 108, 110, 112, 114, and/or 116 may be eliminated, and some or all of its functionality may be provided by other ones of modules 106, 108, 110, 112, 114, and/or 116. As another example, processor 120 may be configured to execute one or more additional modules that may perform some or all of the functionality attributed below to one of modules 106, 108, 110, 112, 114, and/or 116.

Figure 3:
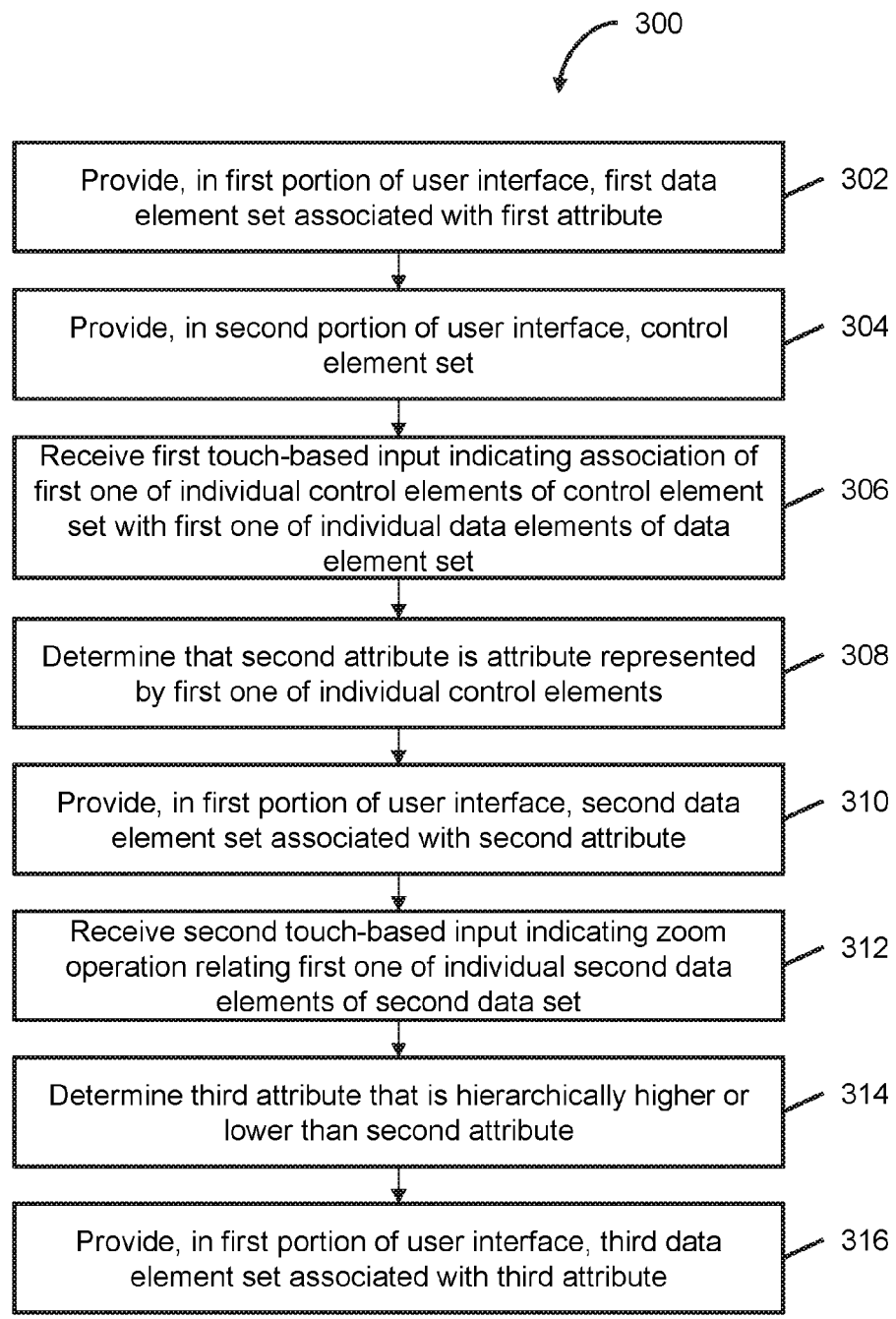
FIG. 3 illustrates a flowchart of processing operations for facilitating touch-association-based creation of and interaction with visualizations, in accordance with one or more implementations.

FIG. 3 illustrates a flowchart of processing operations for facilitating touch-association-based creation of and interaction with visualizations, in accordance with one or more implementations. The operations of process 300 presented below are intended to be illustrative. In some implementations, process 300 may be accomplished with one or more additional operations not described, and/or without one or more of the operations discussed. Additionally, the order in which the operations of process 300 are illustrated in FIG. 3 and described below is not intended to be limiting.

In certain implementations, one or more operations of process 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 300 in response to instructions stored electronically on an electronic storage medium. The one or more processing devices may include one or more devices configured through hardware, firmware, and/or software to be specifically designed for execution of one or more of the operations of process 300.

In an operation 302, a first data element set associated with a first attribute may be provided in a first portion of a user interface. The first data element set may include individual first data elements. Each of the individual first data elements may represent a first value associated with the first attribute. Operation 302 may be performed by a data visualization module that is the same as or similar to data visualization module 108, in accordance with one or more implementations.

In an operation 304, a control element set that include individual control elements may be provided in a second portion of the user interface. Each of the individual control elements represents an attribute. Operation 304 may be performed by a control interface module that is the same as or similar to control interface module 110, in accordance with one or more implementations.

In an operation 306, a first touch-based input indicating an association of a first one of the individual control elements with a first one of the individual first data elements may be received. In certain implementations, the association indicated by the first touch-based input may correspond to dragging the first one of the individual control elements onto the first one of the individual first data elements or dragging the first one of the individual first data elements onto the first one of the individual control elements. Operation 306 may be performed by an input module that is the same as or similar to input module 112, in accordance with one or more implementations.

In an operation 308, a second attribute may be determined to be the attribute represented by the first one of the individual control elements. Operation 308 may be performed by a data visualization module that is the same as or similar to data visualization module 108, in accordance with one or more implementations.

In an operation 310, a second data element set associated with the second attribute may be provided in the first portion of the user interface. The second attribute may be different than the first attribute (associated with the first data element set). The second data element set may include individual second data elements. Each of the individual second data elements may represent a second value associated with the second attribute and correspond to the first value represented by the first one of the first individual data elements. Operation 310 may be performed by a data visualization module that is the same as or similar to data visualization module 108, in accordance with one or more implementations.

In an operation 312, a second touch-based input indicating a zoom operation relating to a first one of the individual second data elements may be received. Operation 312 may be performed by an input module that is the same as or similar to input module 112, in accordance with one or more implementations.

In an operation 314, a third attribute that is hierarchically lower or higher than the second attribute may be determined. Operation 314 may be performed by a data visualization module that is the same as or similar to data visualization module 108, in accordance with one or more implementations.

In an operation 316, a third data element set associated with the third attribute may be provided in the first portion of the user interface. The third data element set may include individual third data elements. Each of the individual third data elements may represent a third value associated with the third attribute. Operation 316 may be performed by a data visualization module that is the same as or similar to data visualization module 108, in accordance with one or more implementations.

In certain implementations, with respect to operations 312, 314, and 316, the zoom operation may comprise a zoom-in operation. The first attribute (associated with the first data element set) may be hierarchically higher than the second attribute (associated with the second data element set). The third attribute may be hierarchically lower than the second attribute. Each of the individual third data elements (of the third data element set) may correspond to the first value represented by the first one of the individual first data elements and the second value represented by the first one of the individual second data elements. In some implementations, hierarchically higher attributes may correspond to higher-level views of data. Hierarchically lower attributes may correspond to lower-level views of data.

In some implementations, with respect to operations 312, 314, and 316, the zoom operation may comprise a zoom-out operation. The first attribute and the third attribute may be hierarchically higher than the second attribute. In one or more implementations, the third attribute may be the first attribute.

Figure 4:
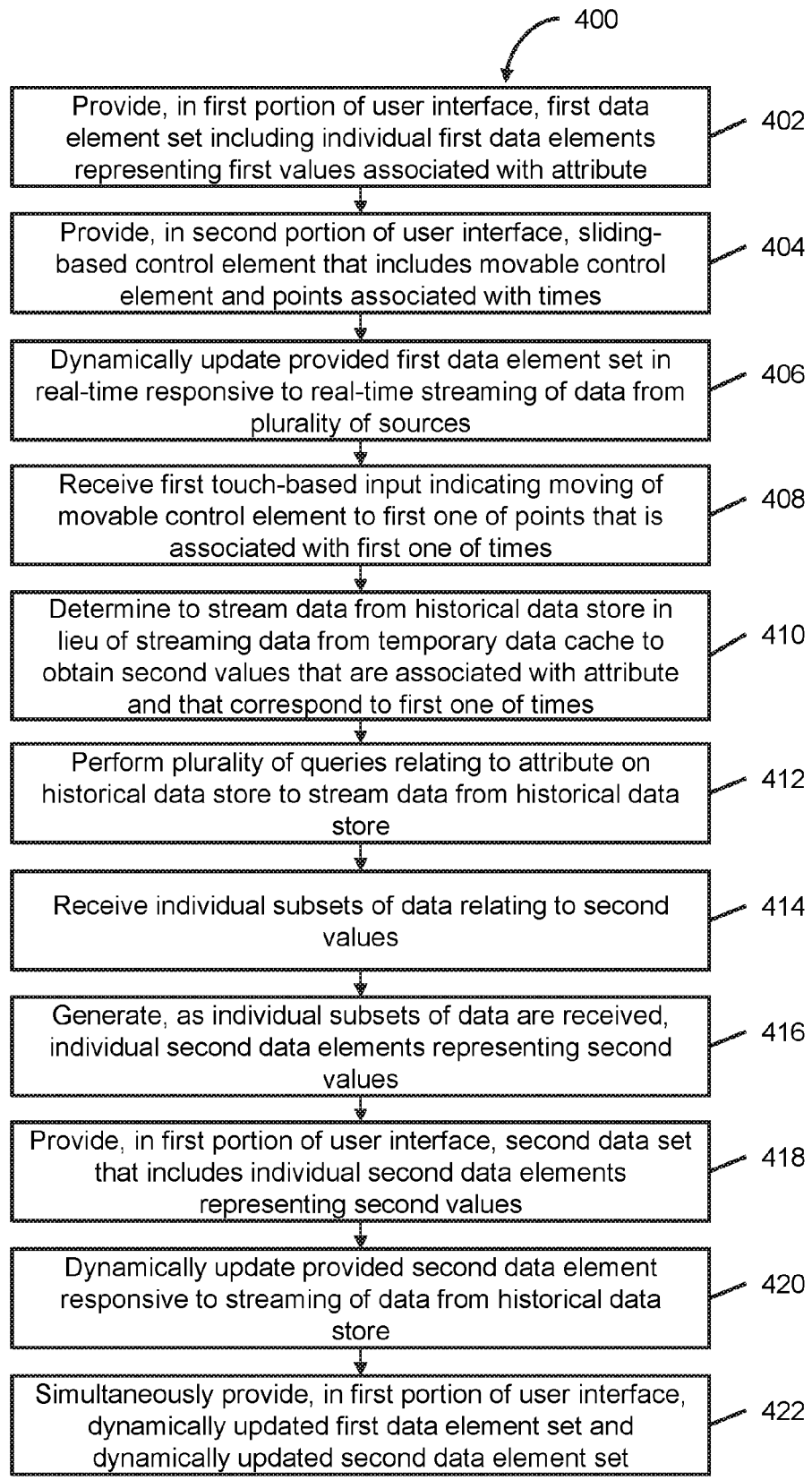
FIG. 4 illustrates a flowchart of processing operations for facilitating sliding-based control associated with multi-data-store retrieval of data, in accordance with one or more implementations.

FIG. 4 illustrates a flowchart of processing operations for facilitating sliding-based control associated with multi-data-store retrieval of data, in accordance with one or more implementations. The operations of process 400 presented below are intended to be illustrative. In some implementations, process 400 may be accomplished with one or more additional operations not described, and/or without one or more of the operations discussed. Additionally, the order in which the operations of process 400 are illustrated in FIG. 4 and described below is not intended to be limiting.

In certain implementations, one or more operations of process 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 400 in response to instructions stored electronically on an electronic storage medium. The one or more processing devices may include one or more devices configured through hardware, firmware, and/or software to be specifically designed for execution of one or more of the operations of process 400.

In an operation 402, a first data element set associated with at least one attribute may be provided in a first portion of a user interface. The first data element set may include individual first data elements representing first values associated with the at least one attribute. Operation 402 may be performed by a data visualization module that is the same as or similar to data visualization module 108, in accordance with one or more implementations.

In an operation 404, a sliding-based control element that includes a movable control element and points associated with times may be provided in a second portion of the user interface. Operation 404 may be performed by a control interface module that is the same as or similar to control interface module 110, in accordance with one or more implementations.

In an operation 406, the provided first data element set may be dynamically updated in real-time responsive to real-time streaming of data from a plurality of sources. The provided first data element set may be dynamically updated such that the individual first data elements may represent dynamically updated values of the first values in lieu of the first values. Operation 406 may be performed by a data visualization module that is the same as or similar to data visualization module 108, in accordance with one or more implementations.

In an operation 408, a first touch-based input indicating moving of the movable control element to a first one of the points that is associated with a first one of the times may be received. Operation 408 may be performed by an input module that is the same as or similar to input module 112, in accordance with one or more implementations.

In an operation 410, a determination to stream data from a historical data store in lieu of streaming data from a temporary data cache to obtain second values that are associated with the at least one attribute and that correspond to the first one of the times may be effectuated. Operation 410 may be performed by a switch module that is the same as or similar to switch module 114, in accordance with one or more implementations.

In an operation 412, queries relating to the at least one attribute may be performed on the historical data store to stream data from the historical data store. Operation 412 may be performed by a query module that is the same as or similar to query module 116, in accordance with one or more implementations.

In an operation 414, individual subsets of data relating to the second values (that are associated with the at least one attribute and that correspond to the first one of the times) may be received. Operation 414 may be performed by a query module that is the same as or similar to query module 116, in accordance with one or more implementations.

In an operation 416, individual second data elements that represent the second values may be generated as the individual subsets of data are received. In some implementations, at least some of the second values may be predicted using the individual subsets of data based on a determination that other subsets of data relating to the at least some of the second values have not yet been received. The individual second data elements may be generated based on the prediction. Operation 416 may be performed by a data visualization module that is the same as or similar to data visualization module 108, in accordance with one or more implementations.

In an operation 418, a second data element set that includes the individual second data elements (representing the second values) may be provided in the first portion of the user interface. Operation 418 may be performed by a data visualization module that is the same as or similar to data visualization module 108, in accordance with one or more implementations.

In an operation 420, the provided second data element set may be dynamically updated responsive to streaming of data from the historical data store. The provided second data element set may be dynamically updated such that the individual second data elements represent dynamically updated values of the second values in lieu of the second values. Operation 420 may be performed by a data visualization module that is the same as or similar to data visualization module 108, in accordance with one or more implementations.

In an operation 422, the dynamically updated first data element set and the dynamically updated second data element set may be simultaneously provided in the first portion of the user interface. The dynamically updated first data element set may correspond to a first time period. The dynamically updated second data element set may correspond to a second time period different than the first time period. The dynamically updated first data element set and the dynamically updated second data element set may continuously correspond to a same reference point of time of the first time period and the second time period. Operation 422 may be performed by a data visualization module that is the same as or similar to data visualization module 108, in accordance with one or more implementations.

Figure 5:
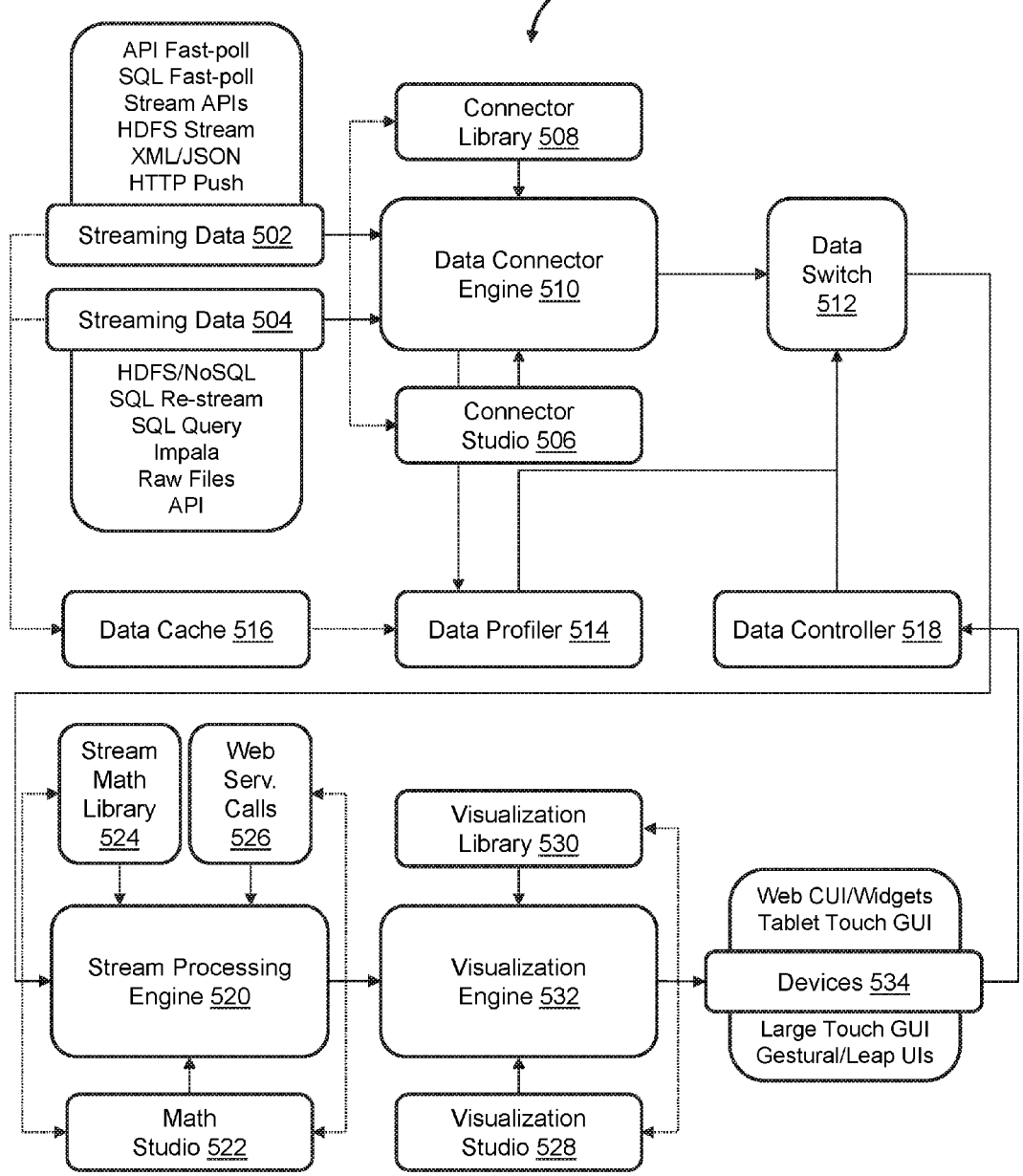
FIG. 5 illustrates a diagram of a data visualization architecture, in accordance with one or more implementations.

FIG. 5 illustrates a diagram of a data visualization architecture 500, in accordance with one or more implementations. As shown by FIG. 5, data may be streamed or otherwise received from sources 502 (e.g., to obtain live data, up-to-date data, etc.) or a historical data store 504. Connector studio 506 may allow administrative users or other users modify connector library 508, for example, by adding, modifying, or removing data connector modules that specify which data streams from the various sources 502 or from historical data store are to be combined by data connectors 510. Data may be streamed to data switch 512 and/or to data profiler 514. Data profiler 514 may, for example, profile the streamed data to associate the streamed data with data types (e.g., general number, currency, target, network address, email address, data state, or other types). Profiled streamed data may be stored in temporary data cache 516.

As depicted by FIG. 5, data controller 518 may work with data switch 512, data profiler 514, stream processing engine 520, or other components of data visualization architecture 500. Data switch 512 may stream data to stream processing engine 520 for processing. Stream and service studio 522 may allow administrative users or other users modify stream math library 524 and a set of web service calls 526, for example, by adding, modify, or removing stream math modules or web services call 526. Stream processing engine 520 may utilize the stream math modules or web service calls 526 to process the streamed data. Visualization studio 528 may allow administrative users or other users to modify visualization library 530, for example, by adding, modifying, or removing visualization modules. Visualization engine 532 may utilize the visualization modules of visualization library 530 to visualize the results of the processing of the data by stream processing engine 520. The results of the processing may be transmitted from stream processing engine 520 to visualization engine 532. The visualized results may be transmitted to devices 534.

Figure 6:
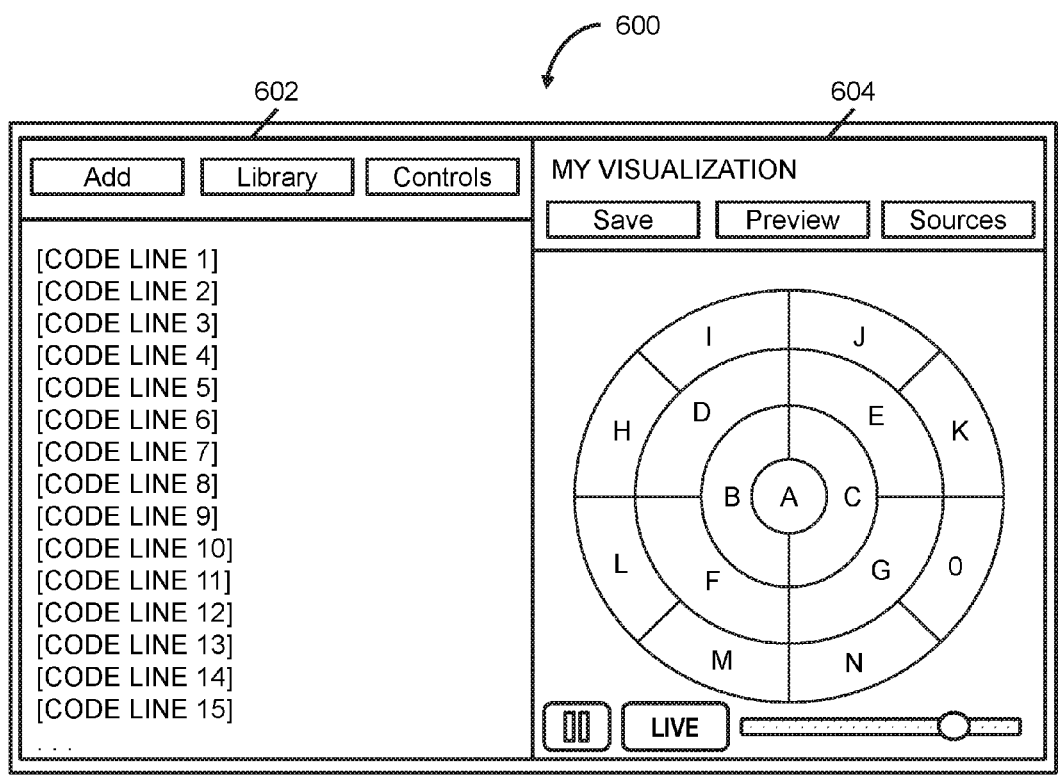
FIG. 6 illustrates a diagram of a user interface for creating or modifying visualizations, in accordance with one or more implementations.

FIG. 6 illustrates a diagram of a user interface 600 for creating or modifying visualizations, in accordance with one or more implementations. As shown by FIG. 6, user interface 600 may include a code editing portion 602 and a live preview portion 604. User interface 600 may, for example, allow a user to write code from scratch to create new visualization modules or modify code of an existing visualization module. In one use case, as the user adds or modifies code in code editing portion 602, live preview portion 604 may present a preview of the visualization based on real-time streaming data. As such, as the user adds or modifies the code in coding editing portion 602, the code may automatically be applied to real-time data streams to generate and present data visualizations reflecting the addition or modification of the code. The code in the coding edition portion 602 may be saved for later use or shared to other users.

Figure 7:
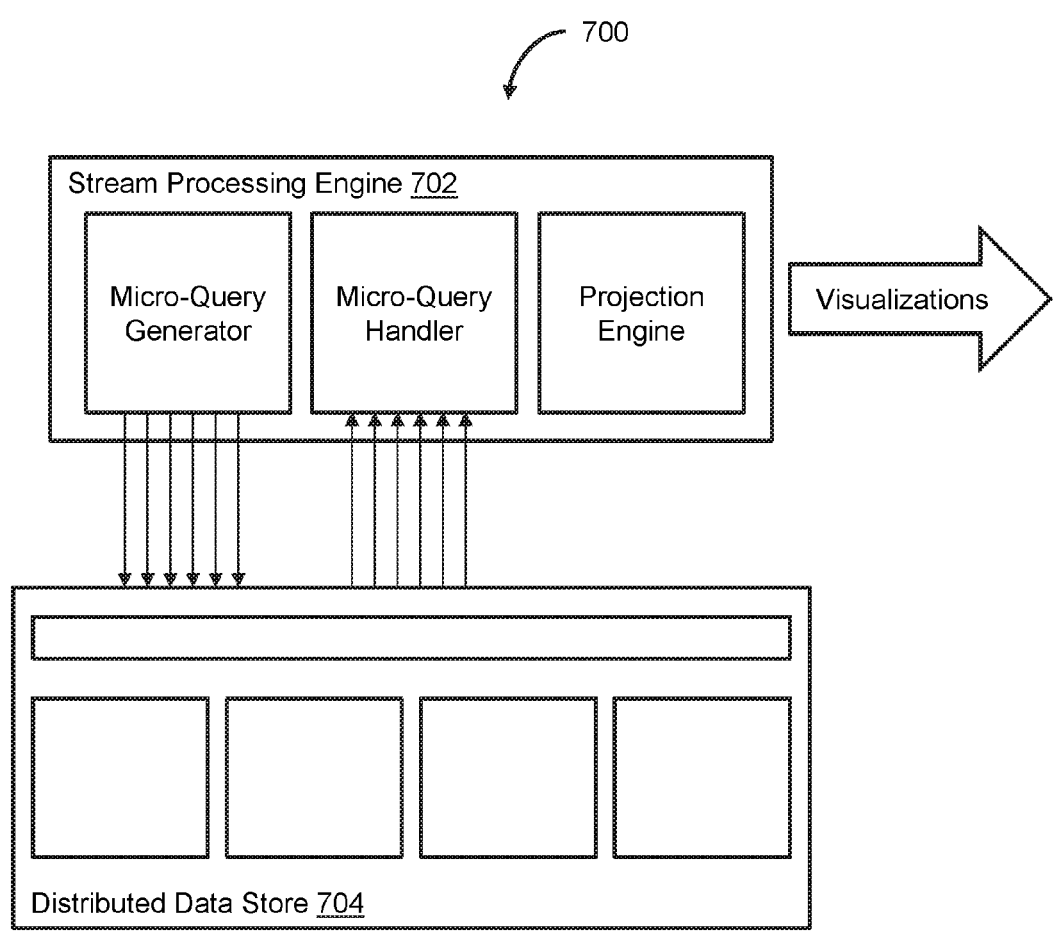
FIG. 7 illustrates a diagram of a stream processing engine configured to perform micro-queries to generate data visualizations, in accordance with one or more implementations.

FIG. 7 illustrates a diagram 700 of a stream processing engine configured to perform micro-queries to generate data visualizations, in accordance with one or more implementations. As shown by FIG. 7, stream processing engine 702 may perform numerous micro-queries on a distributed data store 704. As an example, stream processing engine 702 may include a micro-query generator, a micro-query handler, and a projection engine. The micro-query generator may perform a plurality of micro-queries on distributed store 704 (e.g., comprising numerous data nodes at which data is stored) to update a current data visualization (e.g., updating a current data element set), generate a new data visualization (e.g., generating a new data element set), or facilitate other automated or user-requested operations. In response to the micro-queries, the micro-query handler may begin receiving streams of data from multiple ones of the data nodes. In response to the micro-query handler receiving results from a subset of the micro-queries, the projection engine may approximate or otherwise predict the final data values to generate data elements representing the final data values based on the subset of results. When the results from all of the micro-queries have been received, the actual final data values may be calculated, and the actual final data values may be utilized to generate data elements to replace the approximated data elements.

In one use case, a data visualization corresponding to a trend report for the last 30 days may be requested where each data elements of the data visualization may correspond to a specific day. In response, the micro-query generator may perform micro-queries to obtain data associated with the trend report from distributed data store 704. For example, the micro-query generator may initiate at least 2 queries for each of the last 30 days, resulting in at least 60 queries to obtain the data associated with the trend report. The first query for a particular day may, for instance, obtain results corresponding to 6 specific minutes spaced throughout the day. The results corresponding to the 6 specific minutes may be utilized (e.g., by the projection engine) to approximate the final data value corresponding to the entire day. The approximated data value may be used to generate and present a data element corresponding to the particular day. Subsequently, the second query for the particular day may obtain results corresponding to the remaining minutes in the day. The results corresponding to the 6 specific minutes and the remaining minutes may be utilized to generate the actual final data value corresponding to the entire day. The actual final data value may be used to generate an updated data element corresponding to the particular day. The approximated data element may then be replaced by the updated data element to "sharpen" the requested data visualization. Such approximations and sharpening of the data visualization may further be performed for all of the other days of the trend report.

It should be noted that, in some implementations, multiple levels of "sharpening" may be performed when generating a data element set of a data visualization. By way of example, each data element may be sharpened two or more times before the user is presented with a data element set that is generated based on actual final data values calculated using results from all of the micro-queries. With respect to the above use case, for instance, a first query for a particular day may obtain results corresponding to 3 minutes spaced throughout the day, a second query for the particular day may obtain results corresponding to 60 other minutes spaced throughout the day, and a third query for the particular day may obtain results corresponding to the remaining minutes of the day. Upon being received before the other results, the results corresponding to the 3 minutes of the day may be utilized to approximate the final data value corresponding to the entire day, and the approximated final data value may be utilized to generate and present a data element corresponding to the particular day. Upon being received before the results of the remaining minutes of the day, the results corresponding to the 3 minutes of the day and the results corresponding to the 60 minutes of the day may be utilized to approximate the final data value corresponding to the entire day, and the approximated final data value may be utilized to generate and present an updated data element corresponding to the particular day to replace the previous approximated data element corresponding to the particular day. Subsequently, when the results of the remaining minutes of the particular day are received, all the results for the day may be utilized to calculate the actual final data value corresponding to the entire day. The actual final data value may be utilized to generate and present another updated data element to replace the approximated data element.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A computer-implemented method of facilitating creation of and interaction with visualizations, the method being implemented by a computer system that includes one or more physical processors executing one or more computer program instructions that, when executed, perform the method, the method comprising:

providing, by the one or more physical processors, a first data element set associated with a first attribute in a first portion of a user interface, wherein the first data element set includes a first data element representing a first value associated with the first attribute and one or more other data elements representing other values associated with the first attribute;

providing, by the one or more physical processors, a control element set in a second portion of the user interface, wherein the control element set includes a first control element representing a second attribute and one or more other control elements representing other attributes;

receiving, by the one or more physical processors, a first input indicating a selection of the first control element and the first data element;

performing, by the one or more physical processors, based on the selection, queries relating to the second attribute across a plurality of sources;

receiving, by the one or more physical processors, based on the queries, subsets of data that relate to a second value, the second value being associated with the second attribute and corresponding to the first value;

predicting, by the one or more physical processors, the second value based on the subsets of data before one or more other subsets of data relating to the second value are received; and providing, by the one or more physical processors, based on the prediction of the second value, a second data element set associated with the second attribute, wherein the second data element set includes a second data element representing the second value.

2. The method of claim 1, wherein the selection corresponds to dragging the first control element onto the first data element.

3. The method of claim 1, wherein the selection corresponds to dragging the first data element onto the first control element.

4. The method of claim 1, further comprising:
receiving, by the one or more physical processors, a second input indicating a zoom operation relating to at least one data element of the second data element set; and
providing, by the one or more physical processors based on the zoom operation, a third data element set associated with a third attribute in the first portion of the user interface, wherein the third data element set includes a third data element representing a third value associated with the third attribute.

5. The method of claim 4, wherein the zoom operation comprises a zoom-in operation, the third attribute is different than the first attribute, and the third data element corresponds to the first value and the second value.

6. The method of claim 4, wherein the zoom operation comprises a zoom-out operation, and the third attribute is the first attribute.

7. The method of claim 1, further comprising:
determining, by the one or more physical processors, based on the selection, from which of a temporary data cache or a historical data store to stream data to obtain data relating to the second value; and
obtaining, by the one or more physical processors, data relating to the second value based on the determination regarding from which of the temporary data cache or the historical data store to stream data.

8. A system for facilitating creation of and interaction with visualizations, the system comprising:
one or more physical processors programmed to execute one or more computer program instructions that, when executed, cause the one or more physical processors to:
provide a first data element set associated with a first attribute in a first portion of a user interface, wherein the first data element set includes a first data element representing a first value associated with the first attribute and one or more other data elements representing other values associated with the first attribute;
provide a control element set in a second portion of the user interface, wherein the control element set includes a first control element representing a second attribute and one or more other control elements representing other attributes;
receive a first input indicating a selection of the first control element and the first data element;
perform, based on the selection, queries relating to the second attribute across a plurality of sources;
receive, based on the queries, subsets of data that relate to a second value, the second value being associated with the second attribute and corresponding to the first value;
predict the second value based on the subsets of data before one or more other subsets of data relating to the second value are received; and
provide, based on the prediction of the second value, a second data element set associated with the second attribute, wherein the second data element set includes a second data element representing the second value.

9. The system of claim 8, wherein the selection corresponds to dragging the first control element onto the first data element or dragging the first data element onto the first control element.

10. The system of claim 8, wherein the selection corresponds to dragging the first data element onto the first control element.

11. The system of claim 8, wherein the one or more physical processors are further caused to:
receive a second input indicating a zoom operation relating to at least one data element of the second data element set; and
provide, based on the zoom operation, a third data element set associated with a third attribute in the first portion of the user interface, wherein the third data element set includes a third data element representing a third value associated with the third attribute.

12. The system of claim 8, wherein the one or more physical processors are further caused to:
determine, based on the selection, from which of a temporary data cache or a historical data store to stream data to obtain data relating to the second value; and
obtain data relating to the second value based on the determination regarding from which of the temporary data cache or the historical data store to stream data.

13. A computer-implemented method of facilitating sliding-based control associated with multi-data-store retrieval of data, the method being implemented by a computer system that includes one or more physical processors executing one or more computer program instructions that, when executed, perform the method, the method comprising:
providing, by the one or more physical processors, in a first portion of a user interface, a first data element set that includes first data elements representing first values associated with at least one attribute;
providing, by the one or more physical processors, in a second portion of the user interface, a sliding-based control element that includes a moveable control element and points associated with times;
dynamically updating, by the one or more physical processors, the first data element set in real-time responsive to real-time streaming of data from a plurality of sources such that the first data elements represent dynamically updated values of the first values in lieu of the first values;
receiving, by the one or more physical processors, a first input indicating moving of the movable control element to a first one of the points that is associated with a first one of the times;
determining, by the one or more physical processors, based on the moving of the movable control element, from which of a temporary data cache or a historical data store to stream data to obtain data relating to second values that are associated with the at least one attribute and that correspond to the first one of the times;
responsive to determining to stream data from the historical data store, performing, by the one or more physical processors, queries relating to the at least one attribute on the historical data store;
receiving, by the one or more physical processors, based on the queries, subsets of data relating to at least one value of the second values;
predicting, by the one or more physical processors, the at least one value based on the subsets of data before one or more other subsets of data relating to the at least one value are received; and
providing, by the one or more physical processors, a second data element set in the first portion of the user interface based on the prediction of the at least one value, wherein the second data element set includes second data elements representing the second values.

14. The method of claim 13, further comprising:
receiving, by the one or more physical processors, based on the queries, the one or more other subsets of data;
updating, by the one or more physical processors, the predicted at least one value based on the subsets of data and the one or more other subsets of data; and
updating, by the one or more physical processors, the second data elements based on the updated at least one value.

15. The method of claim 13, wherein determining to stream data from the historical data store comprises determining to stream data relating to the at least one value from the historical data store.

16. The method of claim 15, further comprising:
responsive to determining to stream data relating to at least one other value of the second values from the temporary data cache, streaming, by the one or more physical processors, data relating to the at least one other value from the temporary data cache,
wherein the second data element set is provided in the first portion of the user interface based on the streamed data relating to the at least one other value.

17. A system for facilitating sliding-based control associated with multi-data-store retrieval of data, the system comprising:
one or more physical processors programmed to execute one or more computer program instructions that, when executed, cause the one or more physical processors to:

provide, in a first portion of a user interface, a first data element set that includes first data elements representing first values associated with at least one attribute;
provide, in a second portion of the user interface, a sliding-based control element that includes a moveable control element and points associated with times;
dynamically update the first data element set in real-time responsive to real-time streaming of data from a plurality of sources such that the first data elements represent dynamically updated values of the first values in lieu of the first values;
receive a first input indicating moving of the movable control element to a first one of the points that is associated with a first one of the times;
determine, based on the moving of the movable control element, from which of a temporary data cache or a historical data store to stream data to obtain data relating to second values that are associated with the at least one attribute and that correspond to the first one of the times;
responsive to determining to stream data from the historical data store, perform queries relating to the at least one attribute on the historical data store;
receive, based on the queries, subsets of data relating to at least one value of the second values;
predict the at least one value based on the subsets of data before one or more other subsets of data relating to the at least one value are received; and
provide a second data element set in the first portion of the user interface based on the prediction of the at least one value, wherein the second data element set includes second data elements representing the second values.

18. The system of claim 17, wherein the one or more physical processors are further caused to:
receive, based on the queries, the one or more other subsets of data;
update the predicted at least one value based on the subsets of data and the one or more other subsets of data; and
update the second data elements based on the updated at least one value.

19. The system of claim 17, wherein determining to stream data from the historical data store comprises determining to stream data relating to the at least one value from the historical data store.

20. The system of claim 19, wherein the one or more physical processors are further caused to:
responsive to determining to stream data relating to at least one other value of the second values from the temporary data cache, stream data relating to the at least one other value from the temporary data cache,
wherein the second data element set is provided in the first portion of the user interface based on the streamed data relating to the at least one other value.

* * * * *